(12) United States Patent
Sakikawa

(10) Patent No.: US 7,389,847 B2
(45) Date of Patent: Jun. 24, 2008

(54) HYDRAULIC FOUR-WHEEL DRIVING ARTICULATED VEHICLE

(75) Inventor: Shigenori Sakikawa, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 167 days.

(21) Appl. No.: 10/995,551

(22) Filed: Nov. 24, 2004

(65) Prior Publication Data

US 2005/0178599 A1 Aug. 18, 2005

(30) Foreign Application Priority Data

Nov. 26, 2003 (JP) ............................. 2003-395339

(51) Int. Cl.
*B62D 5/06* (2006.01)
*B60K 17/356* (2006.01)
*B60K 17/34* (2006.01)

(52) U.S. Cl. ...................... 180/418; 180/414; 180/235; 180/242

(58) Field of Classification Search ................. 180/233, 180/235, 242, 414, 417, 418, 420
See application file for complete search history.

(56) References Cited

U.S. PATENT DOCUMENTS

| | | | | |
|---|---|---|---|---|
| 3,260,325 A | * | 7/1966 | Brown et al. ............... | 180/420 |
| 3,811,363 A | * | 5/1974 | Cryder ....................... | 91/516 |
| 3,841,423 A | * | 10/1974 | Holtkamp et al. .......... | 180/6.3 |
| 3,900,075 A | * | 8/1975 | Chichester et al. .......... | 180/6.3 |
| 4,470,475 A | * | 9/1984 | Carlson ...................... | 180/6.48 |
| 4,838,314 A | | 6/1989 | Gage | |
| 4,886,142 A | * | 12/1989 | Yamaoka et al. ............ | 180/242 |
| 4,947,956 A | * | 8/1990 | Henline ....................... | 180/235 |
| 5,427,195 A | * | 6/1995 | Paul et al. ................... | 180/308 |
| 6,732,828 B1 | * | 5/2004 | Abend et al. ................ | 180/242 |
| 6,845,837 B2 | * | 1/2005 | Ohashi et al. ............... | 180/235 |
| 6,889,793 B2 | * | 5/2005 | Okada et al. ................ | 180/435 |
| 6,932,179 B2 | * | 8/2005 | Sakikawa et al. ........... | 180/242 |
| 7,025,162 B2 | * | 4/2006 | Abend et al. ................ | 180/242 |

(Continued)

FOREIGN PATENT DOCUMENTS

EP     1 410 938 A2     4/2004

(Continued)

*Primary Examiner*—Lesley D. Morris
*Assistant Examiner*—Daniel Yeagley
(74) *Attorney, Agent, or Firm*—Sterne, Kessler, Goldstein & Fox, P.L.L.C.

(57) ABSTRACT

A hydraulic four-wheel driving articulated vehicle comprises: a first frame, on which first axles and a first hydraulic motor driving the first axles are mounted; a second frame, on which second axles and a second hydraulic motor driving the second axles are mounted, wherein the first and second frames are connected to each other so as to be relatively rotatable centering on a vertical axis by a steering operation; a hydraulic pump; a hydraulic circuit fluidly connecting the first and second hydraulic motors in series to the hydraulic pump, wherein the hydraulic circuit includes a passage interposed between the first and second hydraulic motors; and pressure control means for releasing oil from the passage between the first and second hydraulic motors when the first and second frames are relatively rotated by the steering operation of the stationary vehicle and backpressure oil discharged from the first and second hydraulic motors is excessively accumulated in the passage between the first and second hydraulic motors.

6 Claims, 19 Drawing Sheets

U.S. PATENT DOCUMENTS

| | | | |
|---|---|---|---|
| 7,082,759 B1 * | 8/2006 | Tsukamoto et al. | 60/456 |
| 7,090,045 B2 * | 8/2006 | Okada et al. | 180/242 |
| 7,096,989 B2 * | 8/2006 | Ohashi et al. | 180/242 |
| 7,204,779 B2 * | 4/2007 | Irikura et al. | 475/230 |
| 2007/0163253 A1 * | 7/2007 | Sakakura et al. | 60/487 |

FOREIGN PATENT DOCUMENTS

JP    2000-270651    10/2000

\* cited by examiner (a)

(b)

HYDRAULIC FOUR-WHEEL DRIVING ARTICULATED VEHICLE

BACKGROUND OF THE INVENTION

1. Field of the Invention

The present invention relates to a hydraulic four-wheel driving articulated vehicle having mutually rotatably connected front and rear frames, wherein a hydraulic motor for driving right and left front wheels is mounted on the front frame, a hydraulic motor for driving right and left rear wheels is mounted on the rear frame, and the hydraulic motors are fluidly connected in series to a hydraulic pump. Especially, the present invention relates to construction for smoothing the turning operation of a vehicle body by rotating the front and rear frames while the vehicle is stationary, that is, the operation of so-called "stationary steering".

2. Related Art

Conventionally, there is a well-known articulated vehicle having mutually rotatably connected front and rear frames 11 and 21 supporting respective transaxles 10 and 20 as shown in FIGS. 1 and 2, and as disclosed in the Japanese Patent Laid Open Gazette 2000-270651, for example.

To steer the articulated vehicle, the front and rear frames are rotated relative to each other so that the vehicle body is bent in a dogleg-shape when viewed in plan. As shown in FIGS. 2 and 4, the vehicle body is bent by expanding/contracting a piston rod 17a of a power steering cylinder 17 interposed between the front and rear frames 11 and 21. Pressure oil supplied to the power steering cylinder 17 is controlled by a power steering cylinder driving hydraulic circuit 58 including a directive control valve interlocking with a steering wheel 4.

The articulated working vehicle is designed so that its four wheels are hydraulically driven. For example, as shown in FIGS. 2, 3 and 5, the transaxle 10 on the front frame 11 incorporates a hydraulic motor 31m for driving front axles 12L and 12R, i.e., front wheels 13L and 13R, and the transaxle 20 on the rear frame 21 incorporates a hydraulic motor 41m for driving rear axles 22L and 22R, i.e., rear wheels 23L and 23R. A hydraulic pump unit 50 incorporates a hydraulic pump 50p for supplying pressure oil to the transaxles 10 and 20, thereby driving the front and rear axles 12L, 12R, 22L and 22R.

The hydraulic motors 31m and 41m in the respective transaxles 10 and 20 are fluidly connected to the hydraulic pump 50p in the hydraulic pump unit 50 in series so as to constitute a hydraulic circuit 27, as show in FIG. 5, so that the two hydraulic motors 31m and 41m are driven by one hydraulic pump 50p. Such a hydraulic circuit system having only one hydraulic pump is suitable for hydraulically driving four wheels of the articulated working vehicle.

It is now assumed that a drive-mode switching valve 28 is opened to fluidly connect the hydraulic motor 31m to the hydraulic pump 50p, and during forward traveling of the vehicle, as shown in FIG. 5, the hydraulic pump 50p discharges pressure oil into a passage 27b connected to the hydraulic motor 41m so that the oil circulating in the hydraulic circuit 27 is directed, as outlined by arrows 24L, so as to be supplied to the hydraulic motor 41m and then to the hydraulic motor 31m. A charge pump 53p supplies hydraulic oil into the hydraulic circuit 27 through charge valves 53a and 53b.

When the vehicle body is bent by rotating the steering wheel 4 for turning of the vehicle when the vehicle is stationary, that is, by the stationary steering operation, each of the four wheels are moved as shown in FIG. 6.

In FIG. 6, the right front wheel 13R is rotated in the direction of an arrow 114R by a resistance force from the ground surface so as to travel forward for a distance 115R. On the other hand, the left front wheel 13L is rotated in the direction of an arrow 114L, opposite to the arrow 114R by a resistance force from the ground surface so as to travel backward for a distance 115L, which is longer than the distance 115R traveled by the right front wheel 13R. As a result, the front wheels 13L and 13R travel backward for a distance equaling the difference between the distances 115L and 115R. Due to the backward traveling of the front wheels 13L and 13R, the hydraulic motor 31m rotates in the backward traveling direction and acts as a pump such as to discharge backpressure oil not into a passage 27a connected to the hydraulic pump 50p, but into a passage 27c connected to the hydraulic motor 41m.

Simultaneously, as shown in FIG. 6, the right rear wheel 23R is rotated in the direction of an arrow 124R by a resistance force from the ground surface so as to travel backward for a distance 125R. On the other hand, the left rear wheel 23L is rotated in the direction of an arrow 124L, opposite to the arrow 124R by a resistance force from the ground surface so as to travel forward for a distance 125L, which is longer than the distance 125R traveled by the right rear wheel 23R. As a result, the rear wheels 23L and 23R travels forward for a distance equaling the difference between the distances 125L and 125R. Due to the forward traveling of the rear wheels 23L and 23R, the hydraulic motor 41m rotates in the forward traveling direction and acts as a pump such as to discharge backpressure oil into the passage 27c connected to the hydraulic motor 31m.

Namely, as shown in FIG. 5, the hydraulic motors 31m and 41m discharge backpressure oil toward each other along respective arrows 25a and 25b, so that the backpressure oil is confined and excessively accumulated in the passage 27c interposed between the hydraulic motors 31m and 41m, thereby restricting rotation of the hydraulic motors 31m and 41m and rotation of the four wheels. This is the reason why the conventional hydraulic four-wheel driving articulated vehicle cannot be smoothly steered when it is stationary, i.e., the stationary steering of the vehicle cannot be performed smoothly.

SUMMARY OF THE INVENTION

An object of the present invention is to provide a hydraulic four-wheel driving articulate vehicle which can be smoothly steered while it is stationary.

To achieve the object, a hydraulic four-wheel driving articulate vehicle comprises: a first frame, on which a first axle and a first hydraulic motor driving the first axle are mounted; a second frame, on which a second axle and a second hydraulic motor driving the second axle are mounted, wherein the first and second frames are connected to each other so as to be rotated relatively centering on a vertical axis by a steering operation of the vehicle; and a hydraulic pump. A hydraulic circuit fluidly connects the first and second hydraulic motors in series to the hydraulic pump. The hydraulic circuit includes a passage in which backpressure oil discharged from the first and second hydraulic motors is excessively accumulated when the first and second frames are relatively rotated by the steering operation of the stationary vehicle. The vehicle comprises pressure control means for releasing the excessively accumulated oil from the passage. Due to the oil-releasing of the pressure control means, the first and second hydraulic motors can be freely rotated and can discharge backpressure oil according to the rotation of the first and second axles, thereby enabling smooth steering of the stationary vehicle, i.e., ensuring smooth "stationary steering".

Preferably, the released excessive oil is returned to a low-pressure part in the hydraulic circuit. Further preferably, the released excessive pressure oil is drained out from the hydraulic circuit and returned to the hydraulic circuit through a charge valve. Accordingly, loss of oil in the hydraulic circuit is prevented.

Preferably, the pressure control means includes a pressure control valve, which is opened for releasing the excessive pressure oil while the vehicle is stationary. Such an automatically operated pressure control valve reduces operation labors of an operator.

These, other and further objects, features and advantages will appear more fully from the following description with reference to accompanying drawings.

BRIEF DESCRIPTION OF THE DRAWINGS

FIG. 18($b$) is an enlarged view of the pressure control valve shown in FIG. 17 when it is closed.

DETAILED DESCRIPTION OF THE INVENTION

Figure 1:
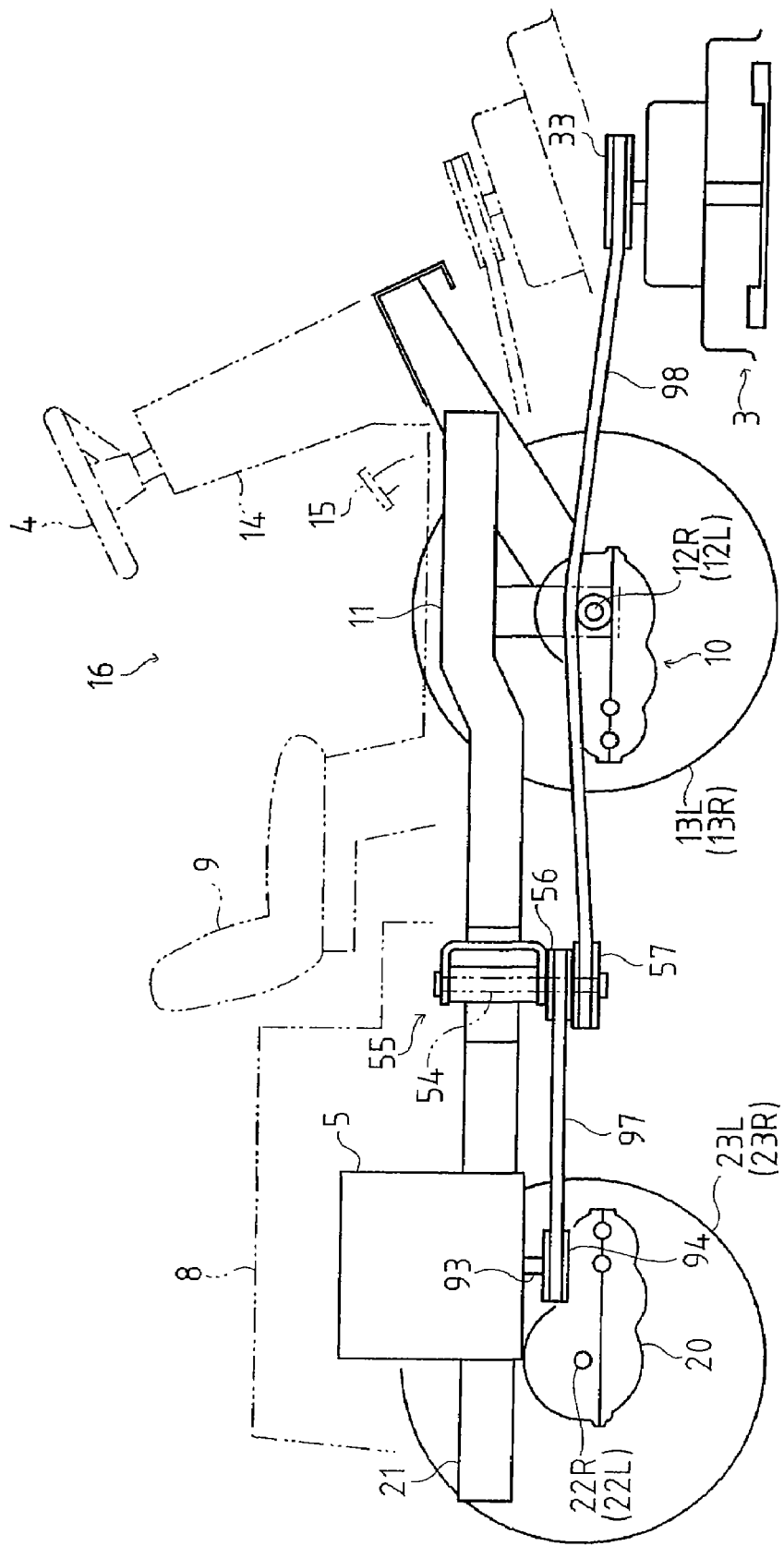
FIG. 1 is a schematic side view of a hydraulic four-wheel driving articulated vehicle.
Figure 2:
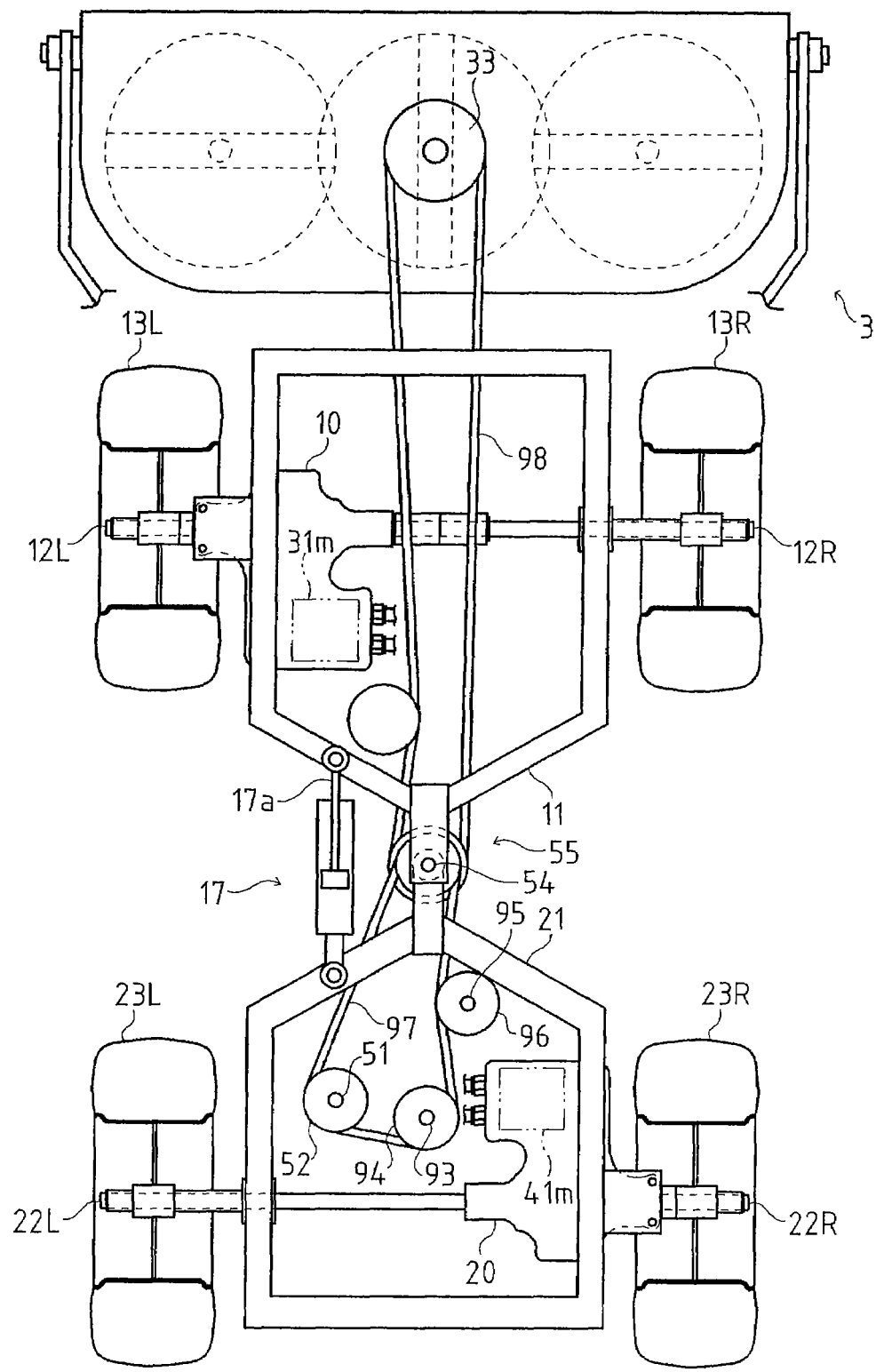
FIG. 2 is a schematic plan view of the vehicle showing a belt-type power transmission system.
Figure 3:
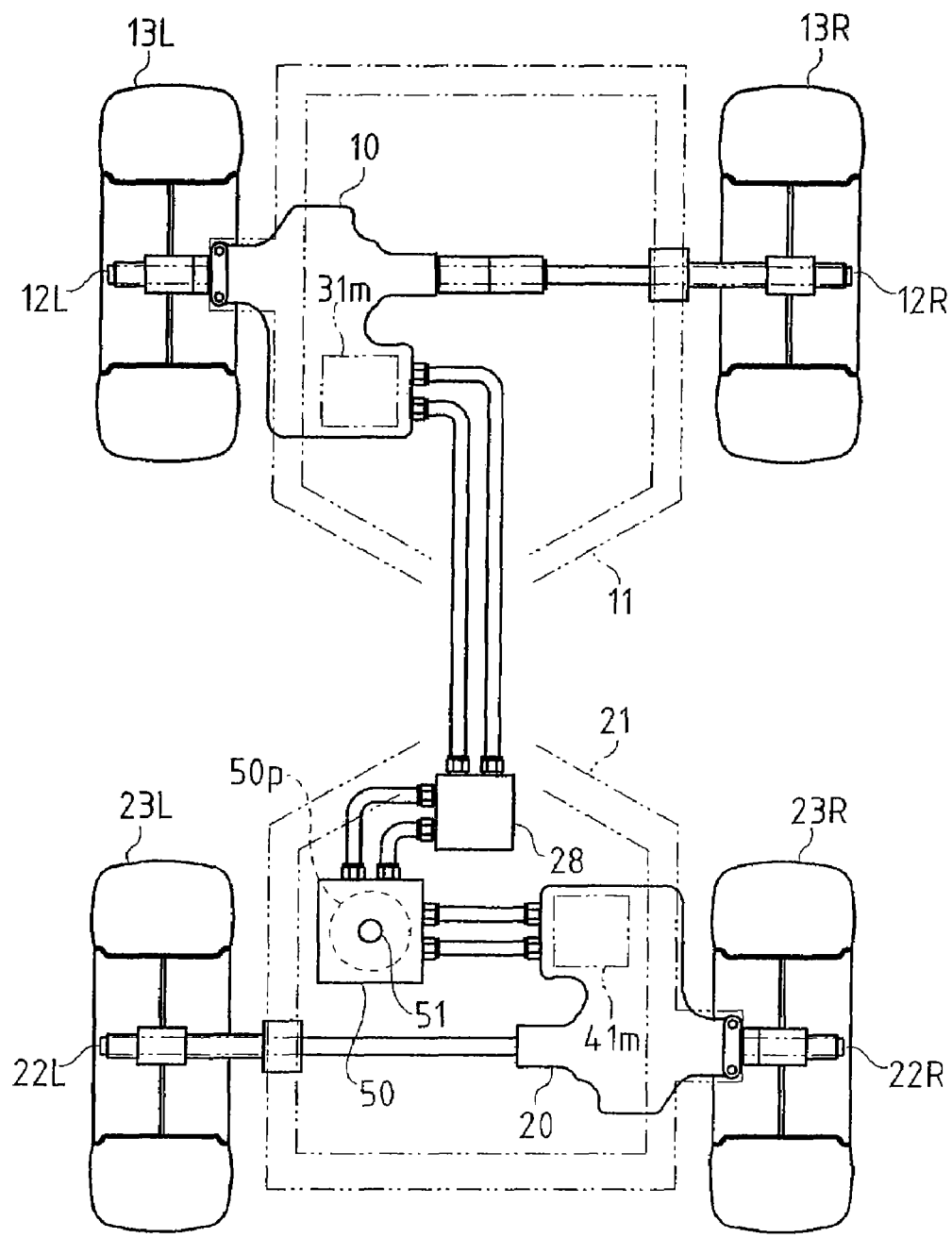
FIG. 3 is a schematic plan view of the vehicle showing a hydraulic power transmission system.
Figure 4:
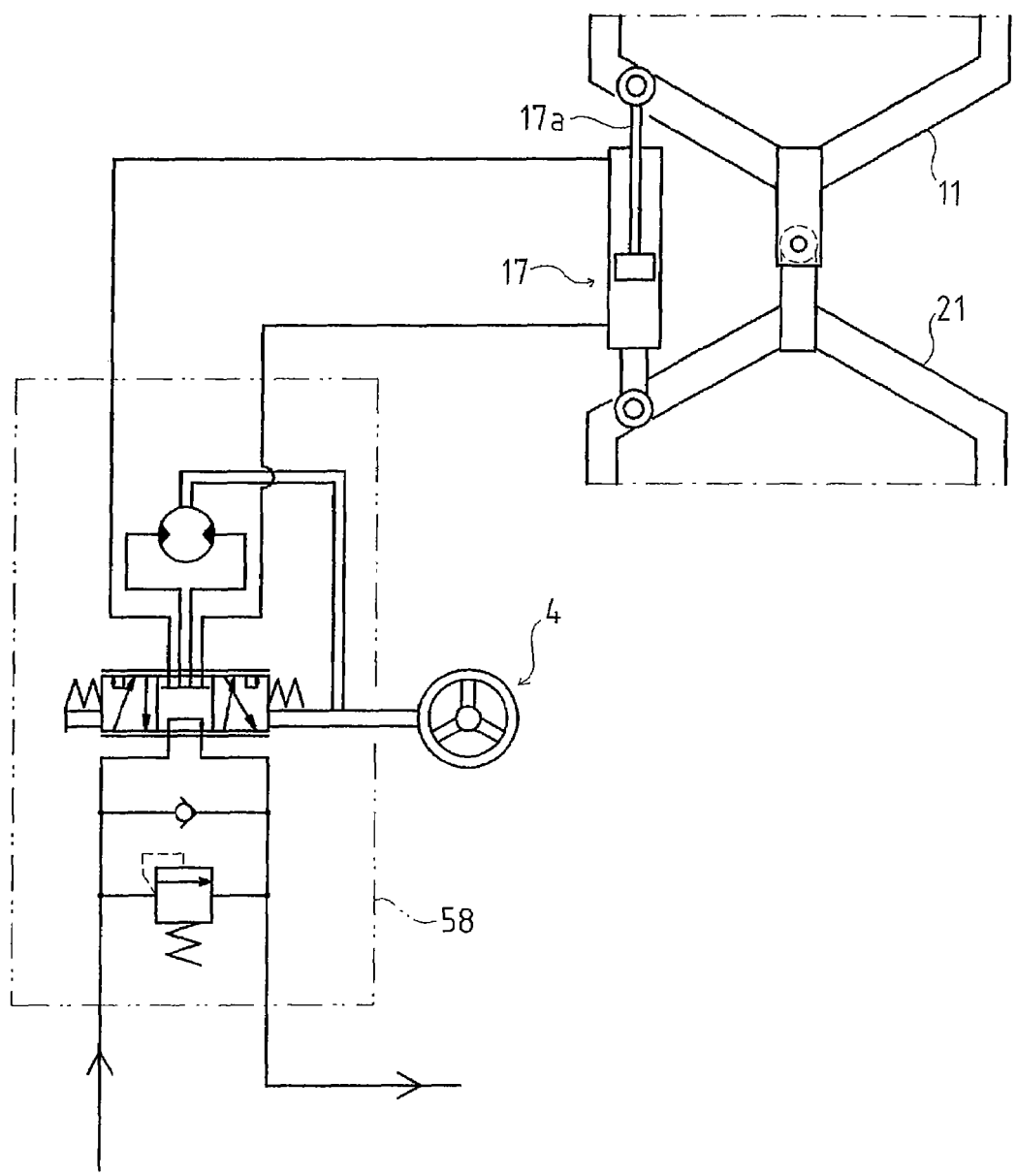
FIG. 4 is a diagram of a steering system of the vehicle.
Figure 5:
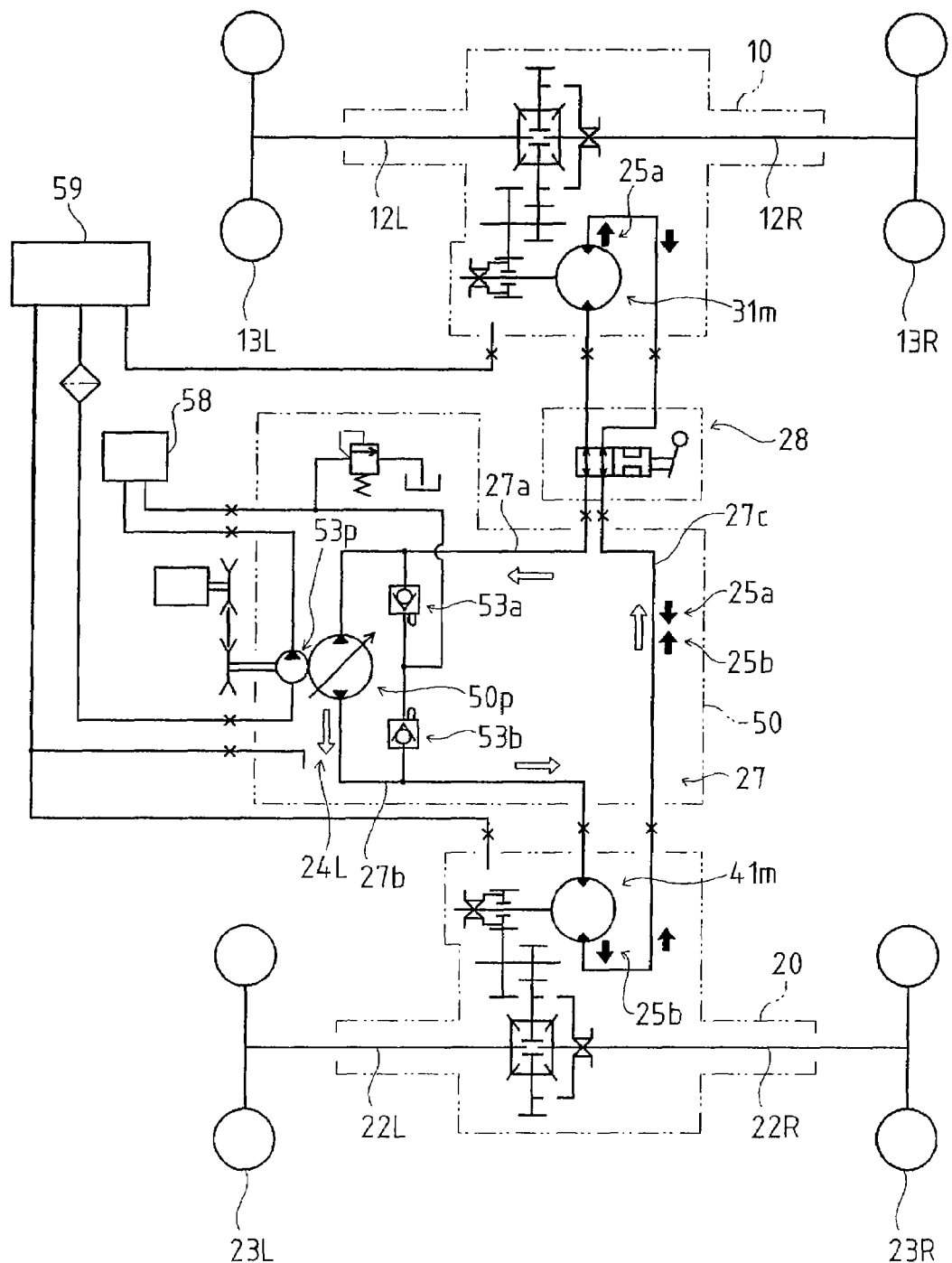
FIG. 5 is a diagram of a conventional hydraulic circuit of the vehicle.

Referring to FIGS. 1 to 3, a four-wheel driving articulated working vehicle will be described. The vehicle has a front frame 11 and a rear frame 21 connected to each other, and has a mower 3 as a working device in front of the front frame 11.

The front frame 11 supports a first transaxle 10. Left and right front wheels 13L and 13R are fixed onto respective front axles 12L and 12R extended from the front transaxle 10. A hydraulic motor 31$m$ is mounted in the front transaxle 10 to drive the front wheel axles 12L and 12R.

On the other hand, the rear frame 21 supports a rear transaxle 20. Left and right rear wheels 23L and 23R are fixed onto respective rear axles 22L and 22R extended from the rear transaxle 20. A hydraulic motor 41$m$ is mounted in the rear transaxle 20 to drive the rear axles 22L and 22R.

A hydraulic pump unit 50 is disposed on the rear frame 21, and pressure oil discharged from the hydraulic pump unit 50 is supplied to the front transaxle 10 and the rear transaxle 20 so as to drive the hydraulic motors 31$m$ and 41$m$.

Alternatively, the hydraulic motors 31$m$ and 41$m$ may be disposed on the front frame 11, for example. Positions of the hydraulic motors 31$m$ and 41$m$ are not limited.

A rear end part of the front frame 11 and a front end part of the rear frame 21 are horizontally rotatably connected to each other through a coupling part 55 as a pivot point, whereby the front frame 11 and the rear frame 21 are connected to each other so as to be relatively rotated centering on a vertical axis by a steering operation, thereby constituting the four-wheel drive working vehicle as a so-called articulated vehicle.

A power steering cylinder 17 is interposed between the front frame 11 and the rear frame 21, as shown in FIG. 2. When a piston rod 17$a$ of the power steering cylinder 17 is extended/contracted, the front frame 11 and the rear frame 21 are articulated centering on the coupling part 55 so that the vehicle is steered.

A steering column 14, a steering wheel 4 and a foot pedal 15 are provided on a front part of the front frame 11. A seat 9 is disposed behind the steering column 14. Accordingly, an operation part 16 is constructed on the front frame 11.

The mower 3 is vertically movably disposed in front of the operation part 16.

An engine 5 covered with a bonnet 8 is disposed on the rear frame 21. The rear transaxle 20 is disposed below the engine 5.

As shown in FIG. 2, on the rear frame 21, an engine output pulley 94 is fixed on a vertical output shaft 93 of the engine 5, and an idle roller 96 is rotatably fitted on a vertical support shaft 95. A pump input pulley 52 is fixed on an input shaft 51 of the hydraulic pump unit 50.

As shown in FIG. 1, the coupling part 55 is provided therein with a relatively rotatable vertical drive shaft 54, which serves as the vertical pivot for rotating the front frame 11 and the rear frame 21, and which is also used to transmit the power of the engine 5 to the mower 3. A coupling part input pulley 56 and a coupling part output pulley 57 are fixed on a lower end portion of the drive shaft 54 below the coupling part 55.

A rear transmission belt 97 is wound around four pulleys, that is, the pump input pulley 52, the engine output pulley 94, the idle roller 96 and the coupling part input pulley 56, so as to transmit a driving force from the engine 5 to a hydraulic pump 50p constructed in the hydraulic pump unit 50 through the pump input pulley 52.

A working machine drive belt 98 is wound around the coupling part output pulley 57 and a drive input pulley 33 of the mower 3 so as to transmit a driving force from the engine 5 to the mower 3.

Figure 7:
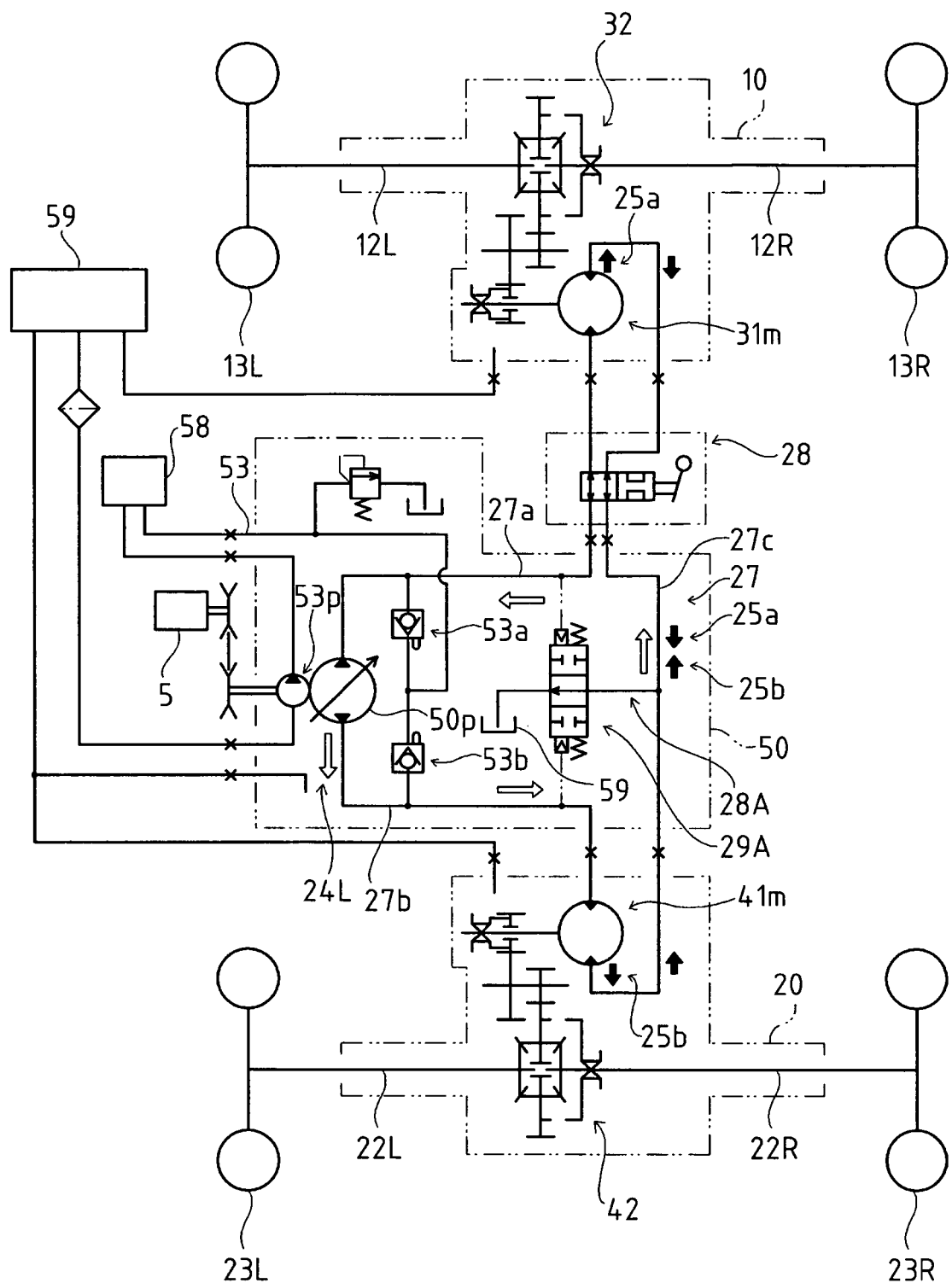
FIG. 7 is a diagram of the hydraulic circuit including pressure control means according to a first embodiment of the present invention when the stationary steering operation is performed and the hydraulic motors discharge oil toward each other.

Next, a hydraulic four-wheel driving system of the vehicle will be described. As shown in FIG. 7, the hydraulic motors 31m and 41m are provided in the front transaxle 10 and the rear transaxle 20, respectively. The front transaxle 10 incorporates a differential 32 for transmitting an output force of the hydraulic motor 31m to the front axles 12L and 12R. The rear transaxle 20 incorporates a differential 42 for transmitting an output force of the hydraulic motor 41m to the rear axles 22L and 22R.

A hydraulic circuit 27 fluidly connects the hydraulic motors 31m and 41m in series to the hydraulic pump 50p provided in the hydraulic pump unit 50. An output force of the engine 5 is inputted to the hydraulic pump unit 50 so as to drive the hydraulic pump 50p and a charge pump 53p.

The charge pump 53p sucks pressure oil from an oil tank 59 and supplies it to a power steering hydraulic circuit 58 so as to operate the piston rod 17a of the power steering cylinder 17. An oil-charging passage 53 is extended from the hydraulic circuit 58 to passages 27a and 27b of the hydraulic circuit 27 through respective charge valves 53a and 53b so that the pressure oil after passing through the power steering hydraulic circuit 58 is supplied to the hydraulic circuit 27 through the charge valves 53a and 53b. The charge valves 53a and 53b are check valves allowing only the flow of oil toward the respective passages 27a and 27b of the hydraulic circuit 27. The charge valves 53a and 53b are provided with respective air-bleeding plungers so as to extract air from the hydraulic circuit 27 during the oil charging.

In the hydraulic circuit 27, the passage 27a connects the hydraulic motor 31m to the hydraulic pump 50p, the passage 27b connects the hydraulic pump 50p to the hydraulic motor 41m, and a passage 27c is interposed between the hydraulic motor 41m and the hydraulic motor 31m. With respect to the hydraulic circuit 27 shown in FIG. 7, the hydraulic pump 50p discharges oil into the passage 27b in the direction of outlined arrows 24L when the vehicle travels forward.

Figure 11:
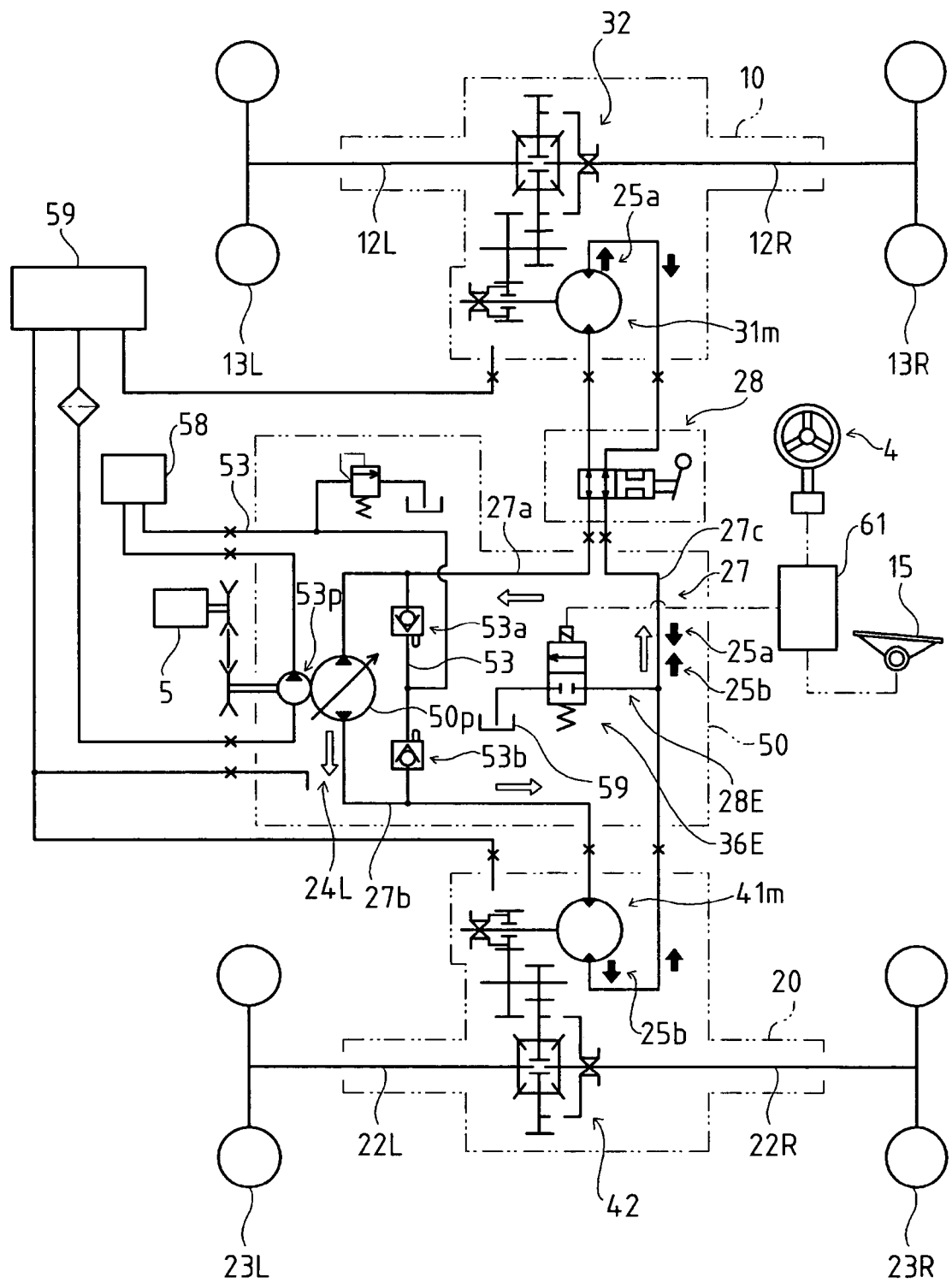
FIG. 11 is a diagram of the hydraulic circuit including pressure control means according to a fifth embodiment of the present invention when the stationary steering operation is performed and the hydraulic motors discharge oil toward each other.
Figure 12:
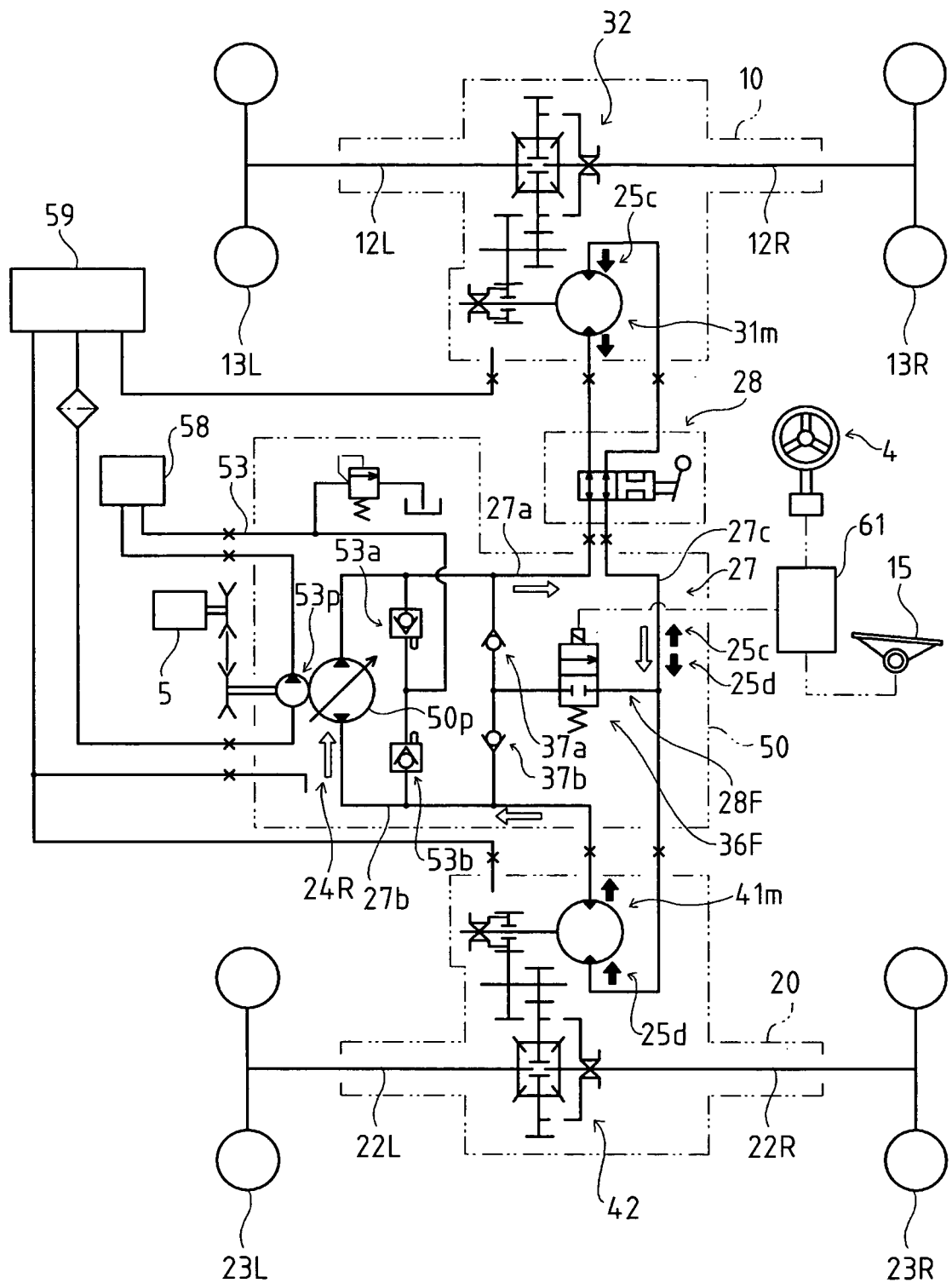
FIG. 12 is a diagram of the hydraulic circuit including pressure control means according to a sixth embodiment of the present invention when the stationary steering operation is performed and the hydraulic motors discharge oil away from each other.

The variable displacement hydraulic pump 50p is provided with means, such as a movable swash plate, for changing the direction and amount of oil discharged from the hydraulic pump 50p. The means is interlockingly connected to a speed control pedal 15, as shown in FIGS. 11 and 12, thereby changing the traveling direction and speed of the vehicle.

As shown in FIG. 7, a drive-mode switching valve 28 is interposed between the transaxles 10 and 20 across the passages 27a and 27c. The drive-mode switching valve 28 is switched between a two-wheel drive mode position and a four-wheel drive mode position. A manipulator for switching the drive mode of the vehicle is interlockingly connected to the drive-mode switching valve 28.

When the drive-mode switching valve 28 is disposed at the four-wheel drive mode position, the passage 27a is opened between the hydraulic pump 50p and the hydraulic motor 31m, and the passage 27c is opened between the hydraulic motors 31m and 41m. Therefore, both the hydraulic motors 31m and 41m are supplied with oil from the hydraulic pump 50p so as to drive all the four wheels 13L, 13R, 23L and 23R.

When the drive-mode switching valve 28 is disposed at the two-wheel drive mode position, a portion of the passage 27a extended from the hydraulic pump 50p is connected to a portion of the passage 27c extended from the hydraulic motor 41m so as to make a closed hydraulic circuit including the hydraulic pump 50p and the hydraulic motor 41m, and a portion of the passage 27a extended from the hydraulic motor 31m is connected to a portion of the passage 27c extended from the hydraulic motor 31m so as to make a hydraulic closed circuit including the hydraulic motor 31m fluidly isolated from the hydraulic pump 50p. Therefore, only the hydraulic motor 41m is fluidly connected to the hydraulic pump 50p so as to drive the rear wheels 23L and 23R. While the vehicle travels, oil circulates in the hydraulic circuit including the hydraulic motor 31m according to rotation of the front wheels 13L and 13R following the driving rotation of the rear wheels 23L and 23R.

Alternatively, the drive-mode switching valve 28 may be disposed across the passages 27b and 27c so that, when the drive-mode switching valve 28 is disposed at the two-wheel drive mode position, the hydraulic motor 31m is fluidly connected to the hydraulic pump 50p so as to drive the front wheels 13L and 13R, and the hydraulic motor 41m is fluidly isolated from the hydraulic pump 50p.

As show in FIG. 7, the hydraulic pump unit 50 is provided therein with pressure control means including a pressure control valve 29A, through which a relief passage 28A branches from the passage 27c to the oil tank 59. The pressure control valve 29A is a hydraulic pilot pressure valve having opposite pilot operation portions for receiving opposite pilot pressures extracted from the respective passages 27a and 27b. When the vehicle is stationary, the hydraulic pump 50p stops suction and delivery of oil so that oil is not circulated in the passages 27a and 27b. Therefore, the opposite pilot pressures are balanced so as to open the pressure control valve 29A.

Figure 6:
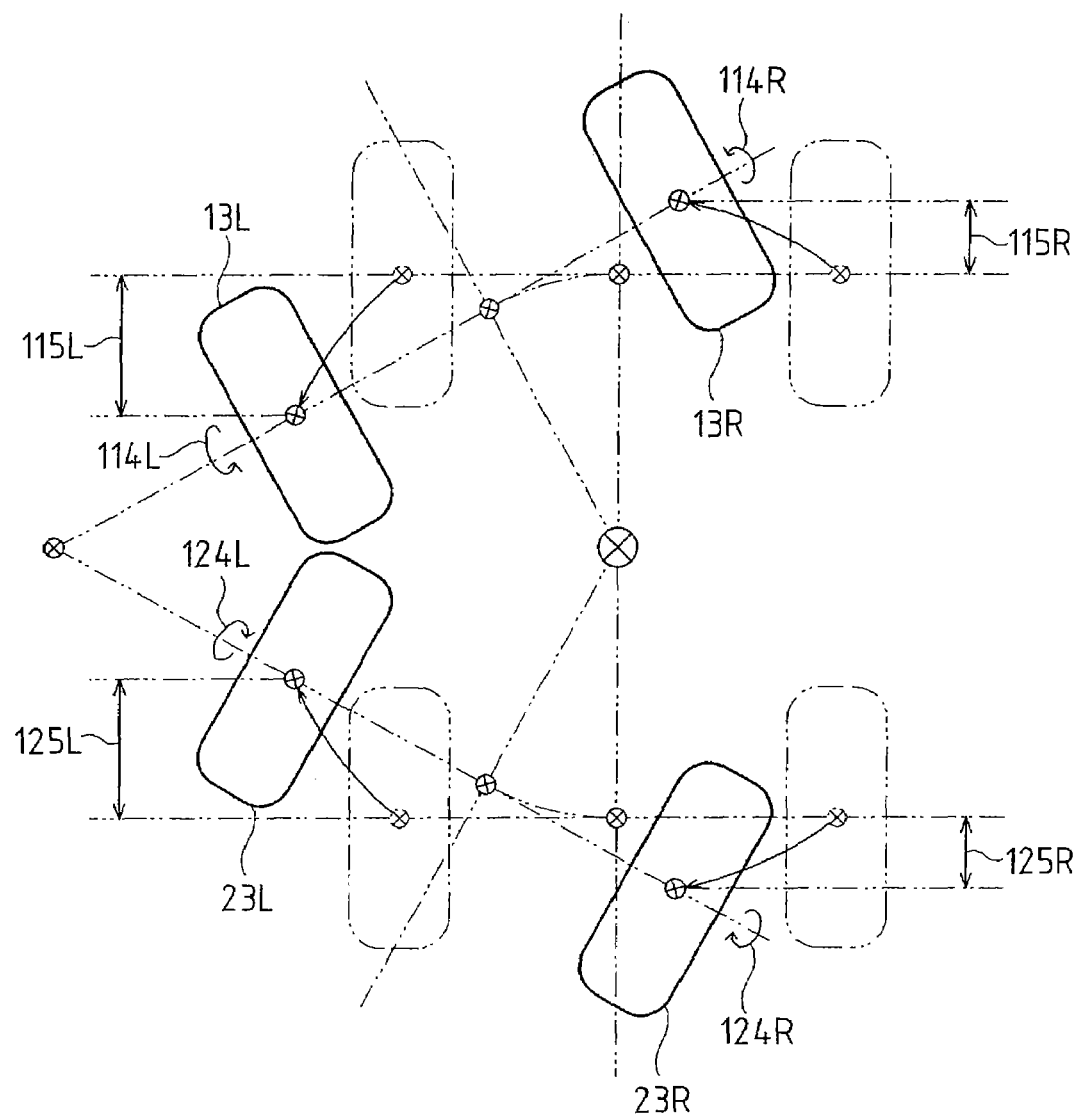
FIG. 6 is a schematic plan view of four wheels of the vehicle when the stationary steering operation is performed.

Referring to FIG. 6, while the stationary steering operation is performed, the backward traveled distance of the front wheels 13L and 13R (the difference between the distances 115L and 115R) is equal to the forward traveled distance of the rear wheels 23L and 23R (the difference between the distances 125L and 125R), so that the backpressure caused by the hydraulic motor 31m is equal to the backpressure caused by the hydraulic motor 41m. Therefore, the passages 27a and 27b are equally hydraulically pressured, i.e., the opposite pilot pressures are balanced so as to open the pressure control valve 29A.

Whether the vehicle travels forward or backward, oil discharged from the hydraulic pump 50p circulates in the hydraulic circuit 27 so that one of the passages 27a and 27b is hydraulically pressured higher than the other so as to supply a pilot pressure for shifting the pressure control valve 29A to one of its opposite closed-valve positions. Thus, the pressure in the passage 27c is kept properly while the vehicle travels.

It is assumed that the flowing direction of oil circulating in the hydraulic circuit 27 of FIG. 7 is designated by outlined arrows 24L during the forward traveling of the vehicle. While the drive-mode switching valve 28 is disposed at the four-wheel drive mode position, if the stationary vehicle is steered, i.e., the stationary steering operation is performed, the four wheels 13L, 13R, 23L and 23R are moved as shown in FIG. 6 so that the hydraulic motors 31m and 41m act as pumps and discharge backpressure oil into the passage 27c toward each other. Arrows 25a designate the flowing direction of oil discharged from the hydraulic motor 31m, and arrows 25b designate the flow direction of oil discharged from the hydraulic motor 41m. In this way, excessive pressure oil is accumulated in the passage 27c so as to resist the rotation of the hydraulic motors 31m and 41m and wheels 13L, 13R, 23L and 23R.

However, while the vehicle is stationary, the passages 27a and 27b are equally hydraulically pressured so that the pressure control valve 29A is automatically opened by the balanced hydraulic pilot pressures, so as to release the excessive pressure oil from the passage 27c and drain it to the oil tank 59 (i.e., a low-pressure circuit) out of the hydraulic circuit 27, thereby preventing the undesired resistance of oil against rotation of the hydraulic motors 31m and 41m. Therefore, the stationary steering is performed smoothly.

The charge pump 53p supplies oil to the hydraulic circuit 27 through the charge valves 53a and 53b so as to compensate for the loss of oil drained to the oil tank 59 through the relief passage 28A and the opened pressure control valve 29A. Alternatively, the relief passage 28A may be extended from the passage 27c to the oil-charging passage 53.

Incidentally, the following embodiments of pressure control means shown in FIGS. 8 to 19 will be described on the assumption that the drive-mode switching valve 28 is disposed at the four-wheel drive mode position.

Figure 8:
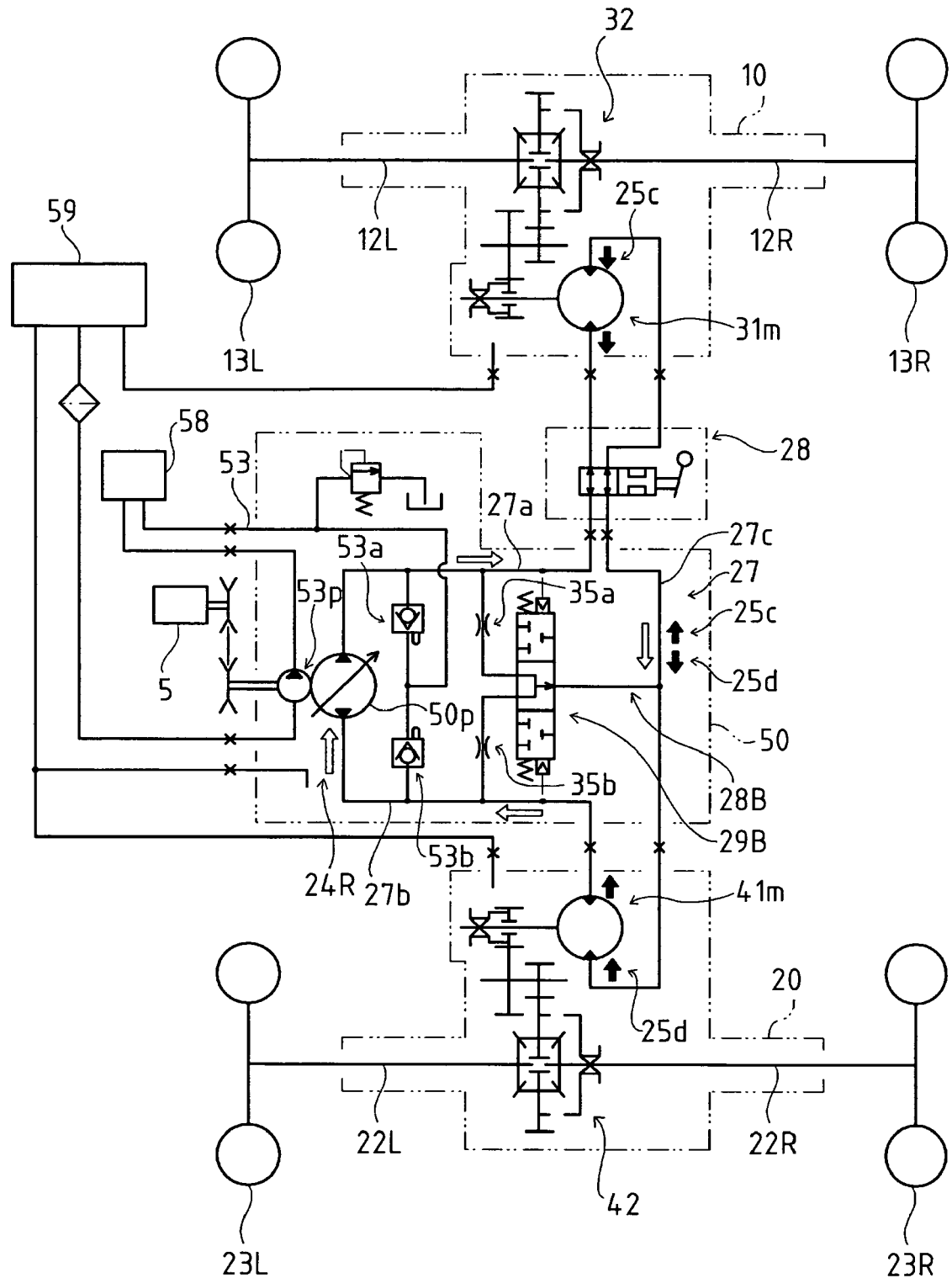
FIG. 8 is a diagram of the hydraulic circuit including pressure control means according to a second embodiment of the present invention when the stationary steering operation is performed and the hydraulic motors discharge oil away from each other.

FIG. 8 illustrates the hydraulic circuit 27, which is similar to that of FIG. 7, but the direction of oil circulating therein when the vehicle travels forward is designated by outlined arrows 24R opposite to the arrows 24L. When the stationary steering is performed, the hydraulic motors 31m and 41m act as pumps such as to discharge backpressure oil into the passages 27a and 27b, respectively, i.e., away from each other. Arrows 25c designate the flowing direction of oil discharged from the hydraulic motor 31m, and arrows 25d designate the flow direction of oil discharged from the hydraulic motor 41m.

The hydraulic circuit 27 of FIG. 8 is provided with alternative suitable pressure control means corresponding to the stationary steering operation according to a second embodiment. The pressure control means includes a pressure control valve 29B. The pressure control valve 29B, when being opened, collects the excessive oil from the passages 27a and 27b through respective orifices 35a and 35b, and sends it to the passage 27c (during the stationary steering operation, the hydraulic pressure in the passage 27c is lower than that in the passages 27a and 27b) through a relief passage 28B.

The pressure control valve 29B is a hydraulic pilot pressure valve having opposite pilot operation portions for receiving opposite pilot pressures extracted from the respective passages 27a and 27b.

Referring to FIG. 6, while the stationary steering is performed, the backward traveled distance of the front wheels 13L and 13R (the difference between the distances 115L and 115R) is equal to the forward traveled distance of the rear wheels 23L and 23R (the difference between the distances 125L and 125R), so that the backpressure caused by the hydraulic motor 31m is equal to the backpressure caused by the hydraulic motor 41m.

Therefore, with respect to the hydraulic circuit 27 of FIG. 8, during the stationary steering operation, the hydraulic motors 31m and 41m equally hydraulically pressure the respective passages 27a and 27b by the backpressure oil therefrom. The pressure control valve 29B is automatically opened by the balanced hydraulic pilot pressures from the passages 27a and 27b, so as to release the excessive pressure oil to the hydraulically lower pressured passage 27c, thereby preventing the undesired resistance of oil against rotation of the hydraulic motors 31m and 41m. Therefore, the stationary steering is performed smoothly.

Whether the vehicle travels forward or backward, oil discharged from the hydraulic pump 50p circulates in the hydraulic circuit 27 so that one of the passages 27a and 27b is hydraulically pressured higher than the other so as to supply a pilot pressure for shifting the pressure control valve 29B to one of its opposite closed-valve positions. Thus, the pressure in the hydraulic circuit 27 is kept properly while the vehicle travels.

Figure 9:
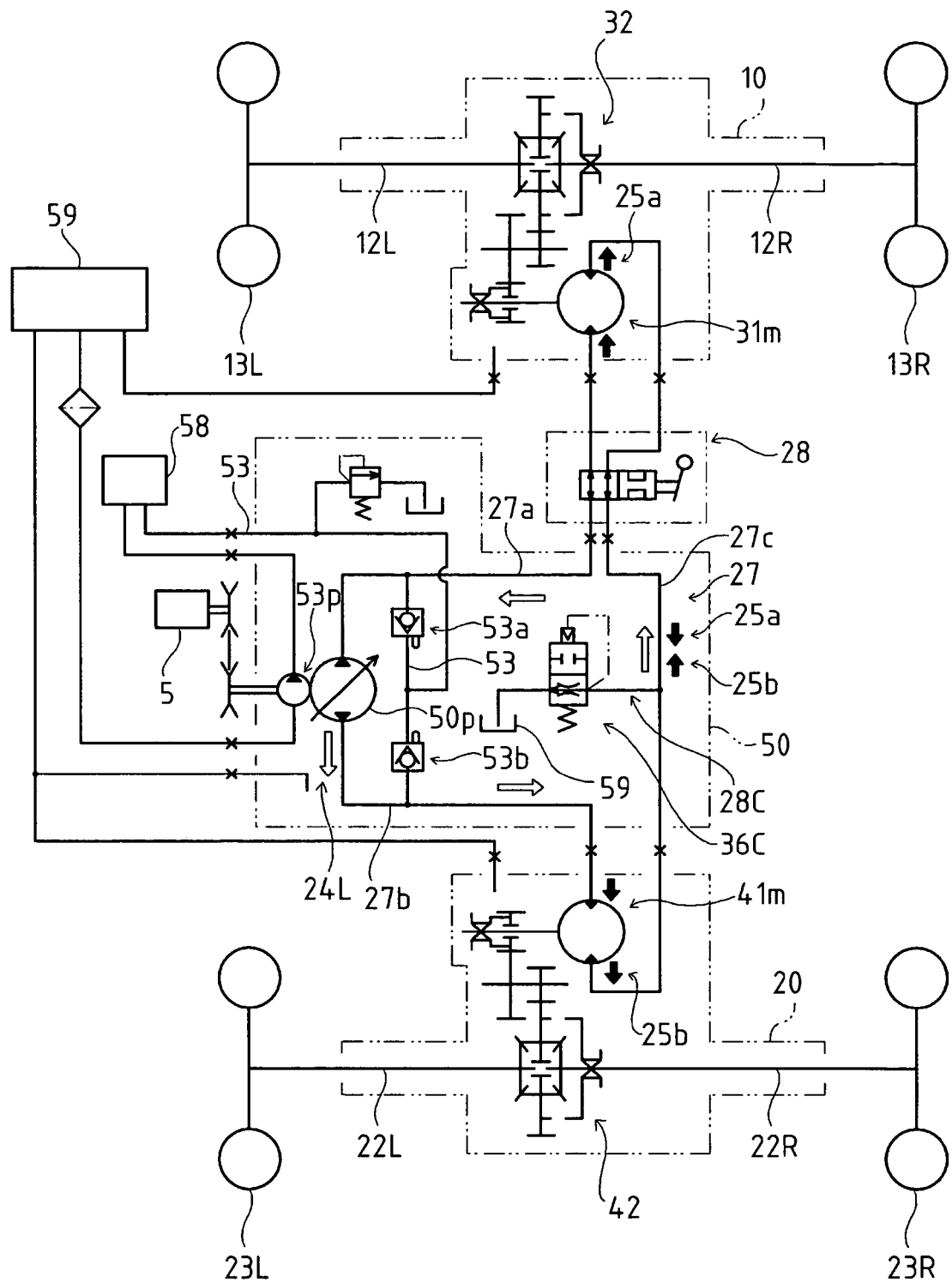
FIG. 9 is a diagram of the hydraulic circuit including pressure control means according to a third embodiment of the present invention when the stationary steering operation is performed and the hydraulic motors discharge oil toward each other.

FIG. 9 illustrates the hydraulic circuit 27, which is similar to that of FIG. 7, wherein the direction of oil circulating therein when the vehicle travels forward is designated by the outlined arrows 24L. When the stationary steering operation is performed, the hydraulic motors 31m and 41m act as pumps such as to discharge backpressure oil into the passage 27c toward each other, as designated by the arrows 25a and 25b.

The hydraulic circuit 27 of FIG. 9 is provided with alternative pressure control means corresponding to the stationary steering operation according to a third embodiment. The pressure control means includes a pressure control valve 36C, through which a relief passage 28C branches from the passage 27c to the oil tank 59. Alternatively, the relief passage 28C may be extended to the oil-charging passage 53.

The pressure control valve 36C is a pilot valve, which is closed when it receives a pilot pressure from a portion of the relief passage 28C in communication with the passage 27c. The pilot pressure is generated for closing the pressure control valve 36C when the hydraulic pump 50p discharges oil, so as to increase the hydraulic pressure in the passage 27c and the relief passage 28C, i.e., while the vehicle travels. When the hydraulic pump 50p (the vehicle) is stationary, oil is not circulated in the hydraulic circuit 27 and the hydraulic pressure in the passage 27c is reduced, thereby canceling the pilot pressure for closing the pressure control valve 36C, and whereby the pressure control valve 36C is opened by a biasing force of a spring so as to drain oil from the passage 27c to the oil tank 59. Even if the stationary steering is operated and excessive pressure oil is accumulated in the passage 27c, the increased hydraulic pressure in the passage 27c is lower than that in the passage 27c when the hydraulic pump 50p acts (when the vehicle travels). Therefore, the pressure control valve 36C is kept open.

Figure 10:
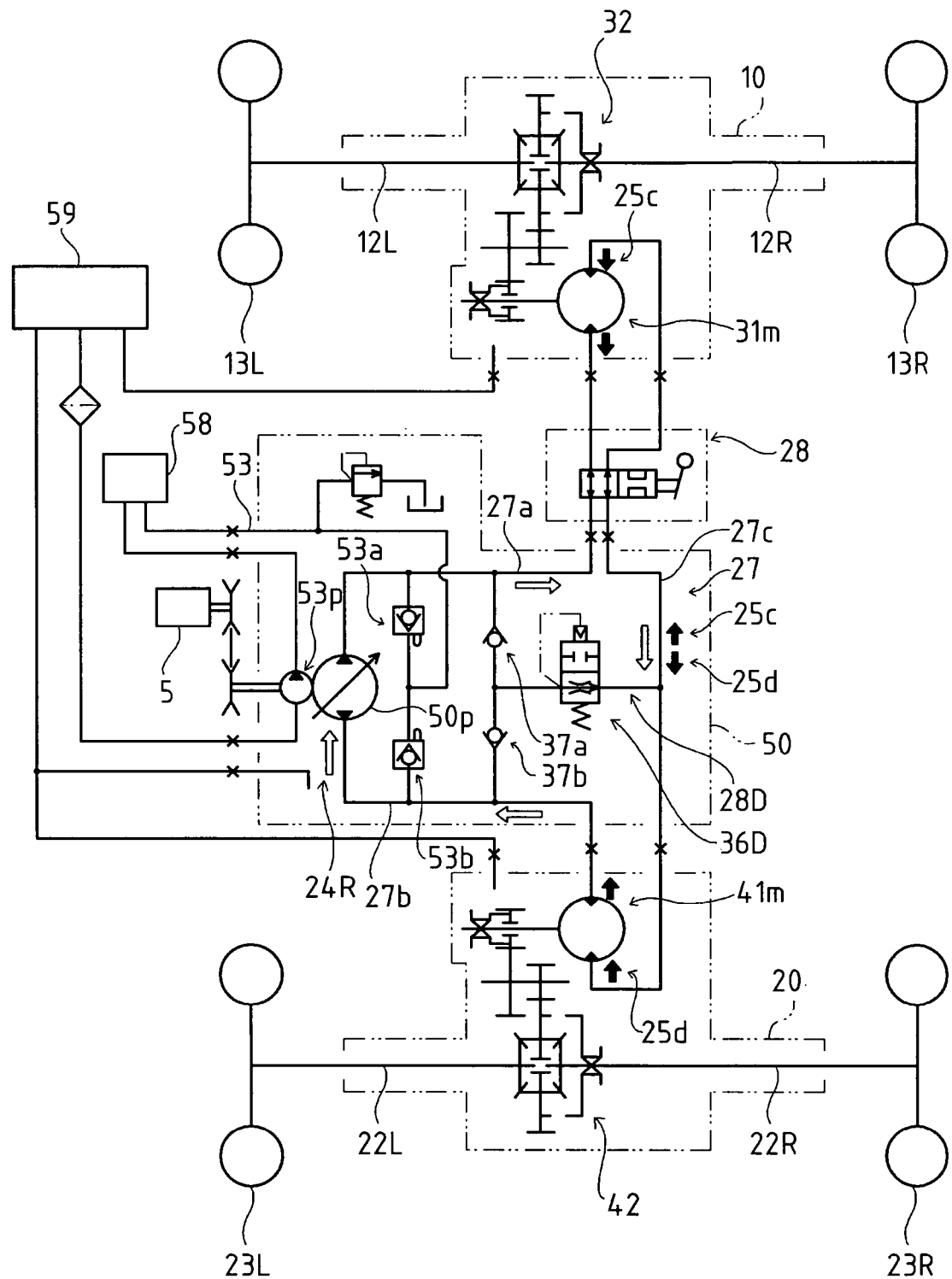
FIG. 10 is a diagram of the hydraulic circuit including pressure control means according to a fourth embodiment of the present invention when the stationary steering operation is performed and the hydraulic motors discharge oil away from each other.

FIG. 10 illustrates the hydraulic circuit 27, which is similar to that of FIG. 8, wherein the direction of oil circulating therein when the vehicle travels forward is designated by the outlined arrows 24R. When the stationary steering operation is performed, the hydraulic motors 31m and 41m act as pumps such as to discharge backpressure oil into the respective passages 27a and 27b away from each other, as designated by the arrows 25c and 25d.

The hydraulic circuit 27 of FIG. 10 is provided with alternative pressure control means corresponding to the stationary steering operation according to a fourth embodiment. The pressure control means includes a pressure control valve 36D. The pressure control valve 36D, when being opened, collects the excessive oil from the passages 27a and 27b through respective check valves 37a and 37b, and sends it to the passage 27c (during the stationary steering operation, the hydraulic pressure in the passage 27c is lower than that in the passages 27a and 27b) through a relief passage 28D.

The pressure control valve 36D is a pilot valve, which is closed when it receives a pilot pressure from the passages 27a and 27b. The pilot pressure is generated for closing the pressure control valve 36D when the hydraulic pump 50p discharges oil, so as to increase the hydraulic pressure in the passage 27a or 27b, i.e., while the vehicle travels. When the hydraulic pump 50p (the vehicle) is stationary, oil is not circulated in the hydraulic circuit 27 and the hydraulic pressure in the passages 27a and 27b is reduced, thereby canceling the pilot pressure for closing the pressure control valve 36D, and whereby the pressure control valve 36D is opened by a biasing force of a spring so as to drain oil from the passages 27a and 27b to the passage 27c. Even if the stationary steering is operated and excessive pressure oil is accumulated in the passages 27a and 27b, the increased hydraulic pressure in the passages 27a and 27b is lower than that in the passages 27a and 27b when the hydraulic pump 50p acts (when the vehicle travels). Therefore, the pressure control valve 36D is kept open.

FIG. 11 illustrates the hydraulic circuit 27, which is similar to that of FIG. 7, wherein the direction of oil circulating therein when the vehicle travels forward is designated by the outlined arrows 24L. When the stationary steering operation is performed, the hydraulic motors 31m and 41m act as pumps such as to discharge backpressure oil into the passage 27c toward each other, as designated by the arrows 25a and 25b.

The hydraulic circuit 27 of FIG. 11 is provided with alternative pressure control means corresponding to the stationary steering operation according to a fifth embodiment. The pressure control means includes a pressure control valve 36E, through which a relief passage 28E branches from the passage 27c to the oil tank 59. Alternatively, the relief passage 28E may be extended to the oil-charging passage 53.

The pressure control valve 36E is an electromagnetic valve controlled by a controller 61 based on detection of operation states of the steering wheel 4 and the speed control pedal 15. When the speed control pedal 15 is not depressed and the steering wheel 4 is rotated from its straight traveling position, i.e., when the stationary steering operation is performed, the controller 61 opens the pressure control valve 36E so as to drain oil from the passage 27c to the oil tank 59. The pressure control valve 36E may be opened simply when the speed control pedal 15 is not depressed whether the steering wheel 4 is rotated for turning or disposed at the straight traveling position. If the speed control pedal 15 is depressed for traveling of the vehicle, the controller 61 closes the pressure control valve 36E.

FIG. 12 illustrates the hydraulic circuit 27, which is similar to that of FIG. 8, wherein the direction of oil circulating therein when the vehicle travels forward is designated by the outlined arrows 24R. When the stationary steering operation is performed, the hydraulic motors 31m and 41m act as pumps such as to discharge backpressure oil into the respective passages 27a and 27b away from each other, as designated by the arrows 25c and 25d.

The hydraulic circuit 27 of FIG. 12 is provided with alternative pressure control means corresponding to the stationary steering operation according to a sixth embodiment. The pressure control means includes a pressure control valve 36F. The pressure control valve 36F, when being opened, collects the excessive oil from the passages 27a and 27b through the respective check valves 37a and 37b, and sends it to the passage 27c (during the stationary steering operation, the hydraulic pressure in the passage 27c is lower than that in the passages 27a and 27b) through a relief passage 28F.

The pressure control valve 36F is an electromagnetic valve controlled by the controller 61 based on detection of operation states of the steering wheel 4 and the speed control pedal 15. When the speed control pedal 15 is not depressed and the steering wheel 4 is rotated from its straight traveling position, i.e., when the stationary steering operation is performed, the controller 61 opens the pressure control valve 36F so as to drain oil from the passages 27a and 27b to the passage 27c. The pressure control valve 36F may be opened simply when the speed control pedal 15 is not depressed whether the steering wheel 4 is rotated for turning or disposed at the straight traveling position. If the speed control pedal 15 is depressed for traveling of the vehicle, the controller 61 closes the pressure control valve 36F.

Figure 13:
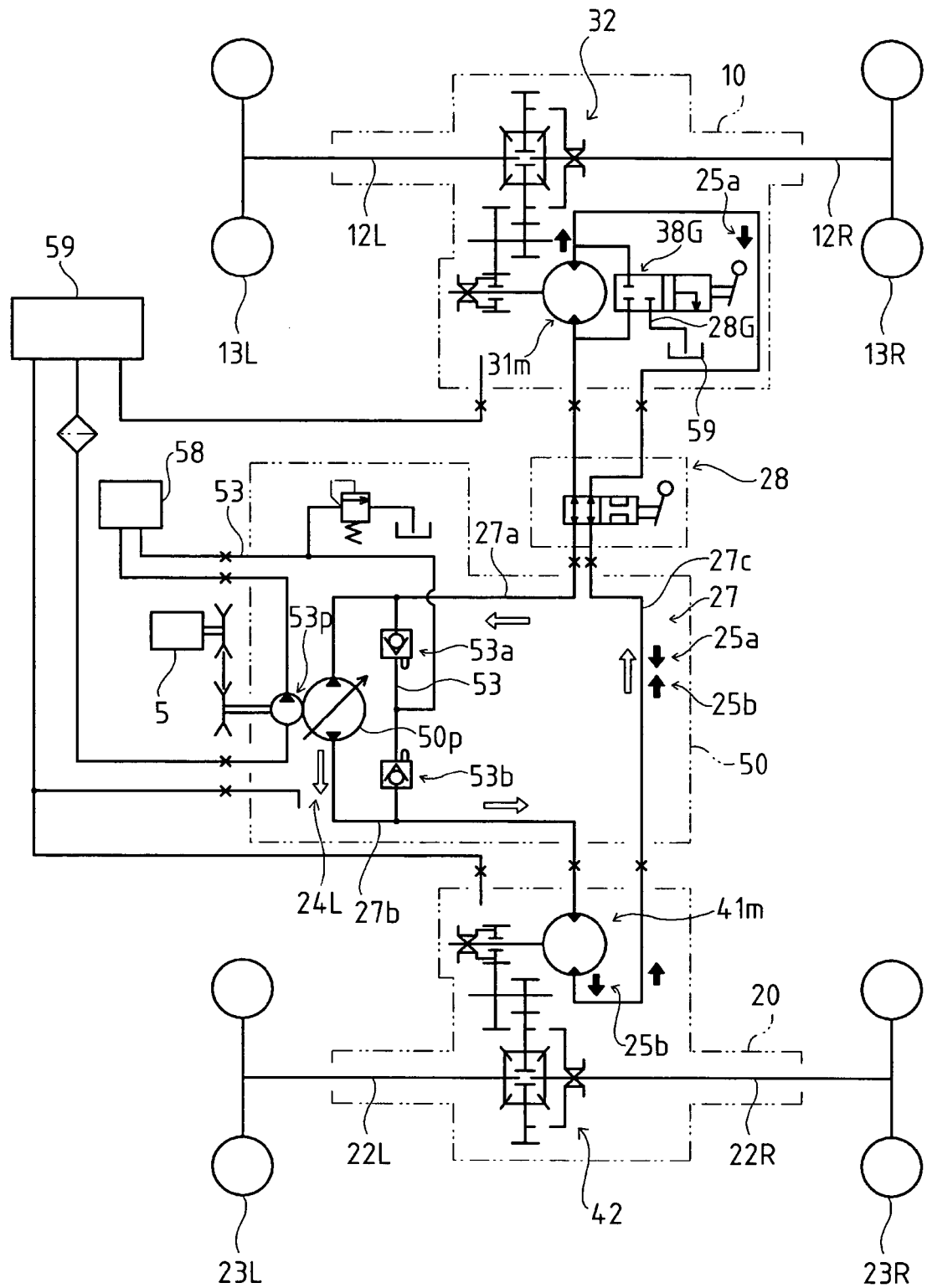
FIG. 13 is a diagram of the hydraulic circuit including pressure control means according to a seventh embodiment of the present invention when the stationary steering operation is performed and the hydraulic motors discharge oil toward each other.

FIG. 13 illustrates the hydraulic circuit 27, which is similar to that of FIG. 7, wherein the direction of oil circulating therein when the vehicle travels forward is designated by the outlined arrows 24L. When the stationary steering operation is performed, the hydraulic motors 31m and 41m act as pumps such as to discharge backpressure oil into the passage 27c toward each other, as designated by the arrows 25a and 25b.

The hydraulic circuit 27 of FIG. 13 is provided with alternative pressure control means corresponding to the stationary steering operation according to a seventh embodiment. The pressure control means includes a pressure control valve 38G, through which a relief passage 28G branches from the passage 27c to the oil tank 59. Alternatively, the relief passage 28G may be extended to the oil-charging passage 53.

The pressure control valve 38G is a manually operated valve, which is switched between a closed-valve position for isolating the relief passage 28G from the passage 27c and an opened-valve position for connecting the relief passage 28G to the passage 27c. In correspondence to the stationary steering operation, the pressure control valve 38G is manually disposed at the opened-valve position so as to drain the excessive pressure oil from the passage 27c to the oil tank 59.

The pressure control valve 38G is disposed in the front transaxle 10. In this regard, as show in FIG. 14, a center section 31c of the hydraulic motor 31m is provided in a housing 71 of the front transaxle 10. In the center section 31c are formed a pair of kidney ports 31a and 31b (serving as portions of the passages 27a and 27c) of the hydraulic motor 31m, and bypass oil bores 38a and 38b connected to the respective kidney ports 31a and 31b. Further, in the center section 31c are formed a connection oil bore 38c for connecting the bypass oil bores 38a and 38b to each other, and a drain oil bore 38d (serving as the portion of the relief passage 28G in communication with the oil tank 59) for connecting the connection oil bore 38c to the oil tank 59.

A rotary shaft 39 is rotatably inserted into the center section 31c and interposed between the connection oil bore 38c and the drain oil bore 38d so that connection/disconnection of the connection oil bore 38c to and from the drain oil bore 38d is switched by the rotation of the rotary shaft 39. A T-shaped oil bore 39a is formed in the rotary shaft 39. The oil bore 39a connects the connection oil bore 38c to the drain oil bore 38d when the rotary shaft 39 is disposed at a predetermined rotation position. The rotary shaft 39 is operationally connected to an un-shown manipulator out of the housing 71. An operator can optionally operate the manipulator for rotating the rotary shaft 39 so as to switch the connection/disconnection of the connection oil bore 38c to and from the drain oil bore 38d, i.e., to switch the pressure control valve 38G between the closed-valve position and the opened-valve position.

Whichever of the kidney ports 31*a* and 31*b* is selected as a delivery port of the hydraulic motor 31*m* for discharging backpressure oil into the passage 27*c* during the stationary steering operation, the opened pressure control valve 38G communicates with both the kidney ports 31*a* and 31*b* so as to surely release the excessive pressure oil accumulated in the passage 27*c*.

Figure 15:
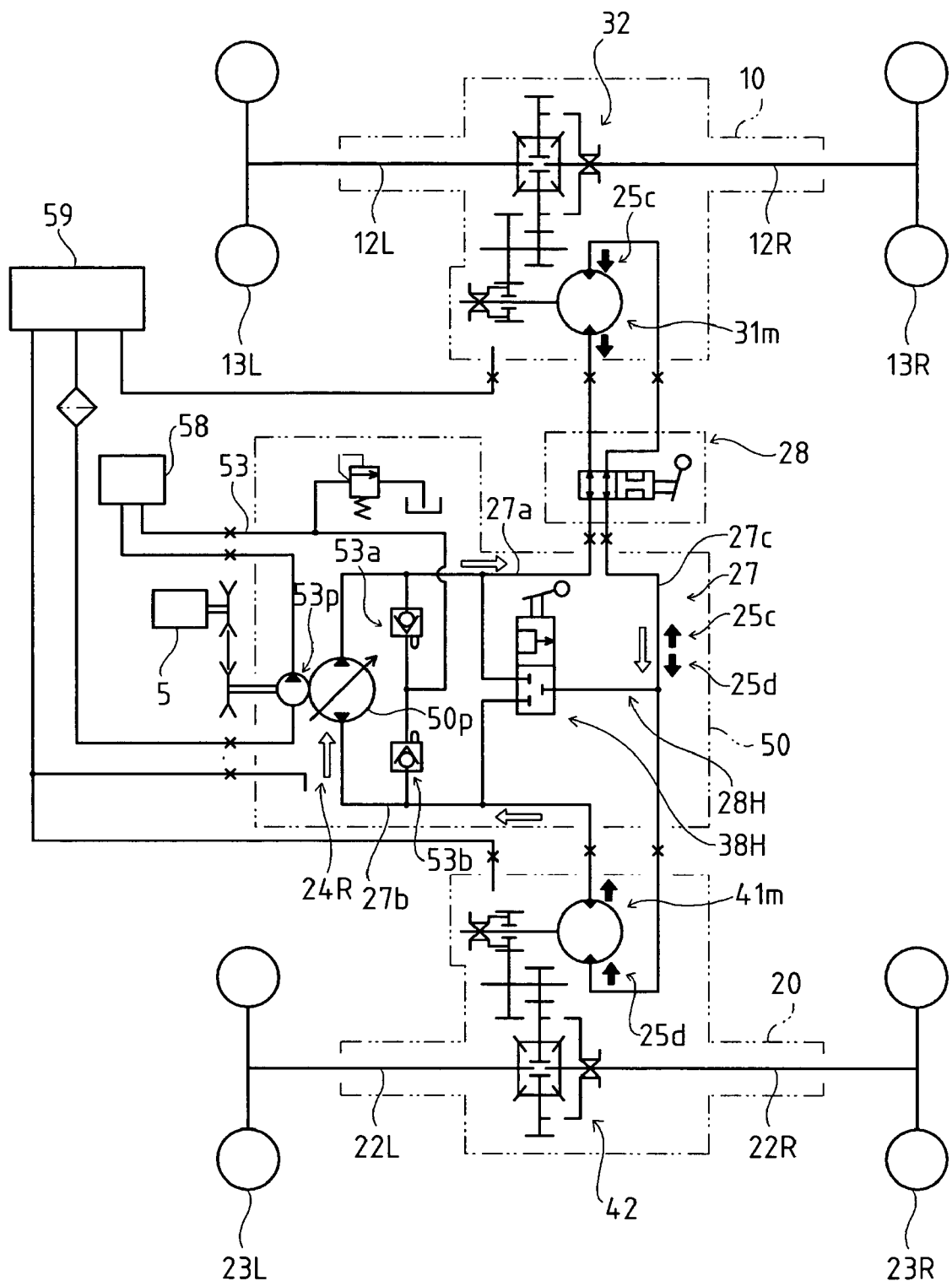
FIG. 15 is a diagram of the hydraulic circuit including pressure control means according to an eighth embodiment of the present invention when the stationary steering operation is performed and the hydraulic motors discharge oil away from each other.

FIG. 15 illustrates the hydraulic circuit 27, which is similar to that of FIG. 8, wherein the direction of oil circulating therein when the vehicle travels forward is designated by the outlined arrows 24R. When the stationary steering operation is performed, the hydraulic motors 31*m* and 41*m* act as pumps such as to discharge backpressure oil into the respective passages 27*a* and 27*b* away from each other, as designated by the arrows 25*c* and 25*d*.

The hydraulic circuit 27 of FIG. 15 is provided with alternative pressure control means corresponding to the stationary steering operation according to an eighth embodiment. The pressure control means includes a pressure control valve 38H. The pressure control valve 38H, when being opened, collects the excessive oil from the passages 27*a* and 27*b*, and sends it to the passage 27*c* (during the stationary steering operation, the hydraulic pressure in the passage 27*c* is lower than that in the passages 27*a* and 27*b*) through a relief passage 28H.

The pressure control valve 38H is a manually operated valve, which is switched between a closed-valve position for isolating the relief passage 28H from the passages 27*a* and 27*b* and an opened-valve position for connecting the relief passage 28H to the passages 27*a* and 27*b*. In correspondence to the stationary steering operation, the pressure control valve 38H is manually disposed at the opened-valve position so as to drain the excessive pressure oil from the passages 27*a* and 27*b* to the passage 27*c*.

Figure 14:
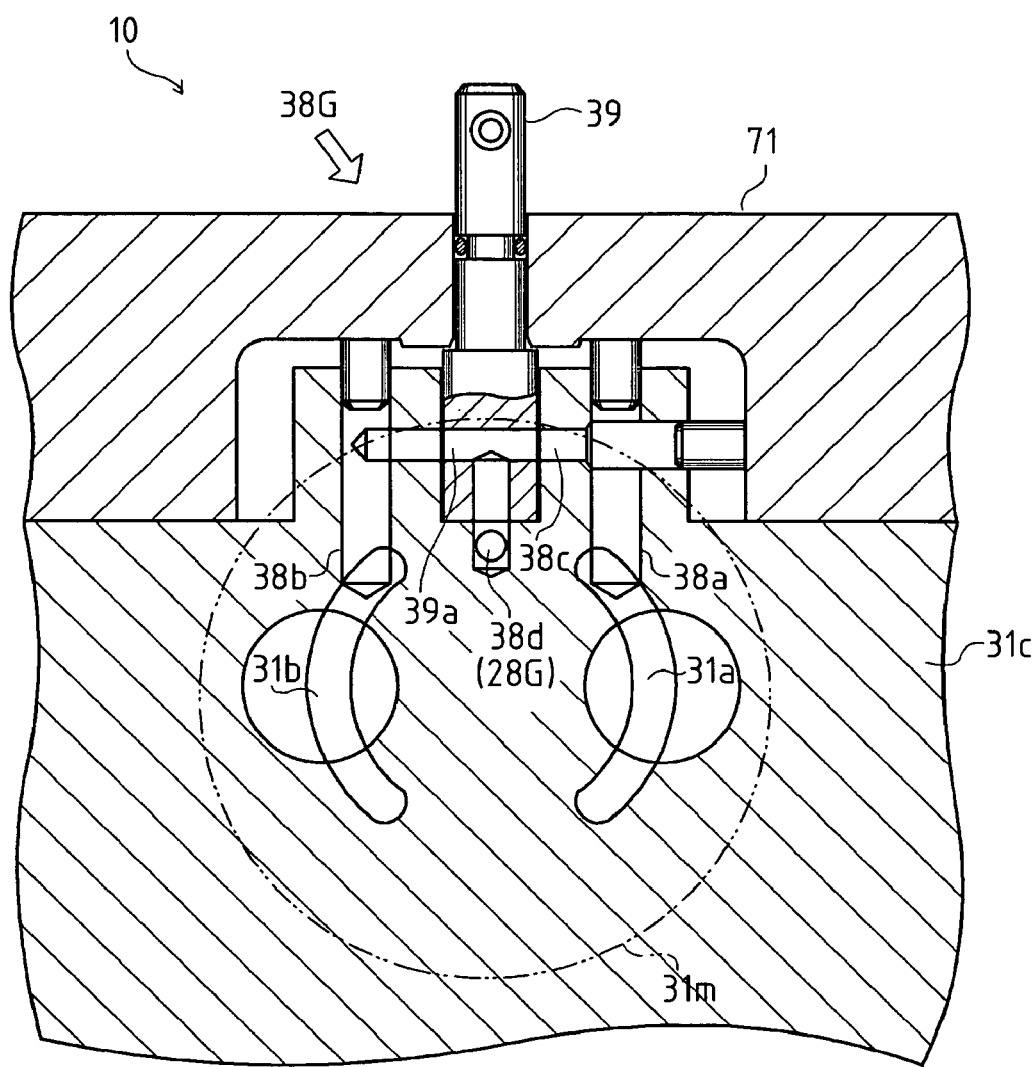
FIG. 14 is a sectional view of a pressure control valve in the pressure control means according to the seventh embodiment.

The pressure control valve 38H is disposed in the hydraulic pump unit 50. The pressure control valve 38H may be constructed similar to the pressure control valve 38G as shown in FIG. 14. That is, a center section of the hydraulic pump 50*p* may be formed therein with oil bores connected to both kidney ports of the hydraulic pump 50*p*, and a rotary shaft serving as the pressure control valve 38H may be inserted into the center section so as to collect excessive backpressure oil from the kidney ports of the hydraulic pump 50*p* and drain it to the relief passage 28H.

Figure 16:
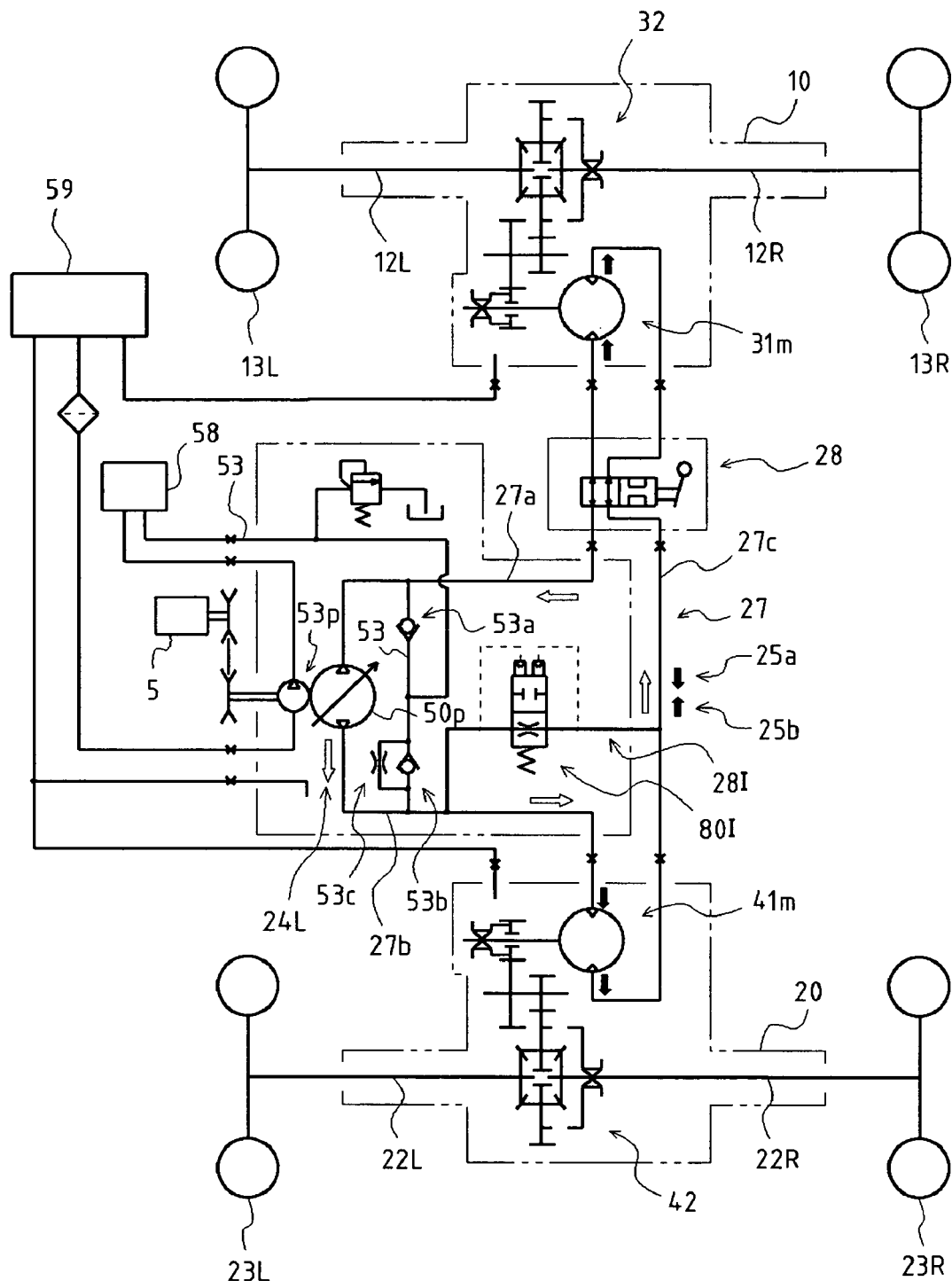
FIG. 16 is a diagram of the hydraulic circuit including pressure control means according to a ninth embodiment of the present invention when the stationary steering operation is performed and the hydraulic motors discharge oil toward each other.
Figure 19:
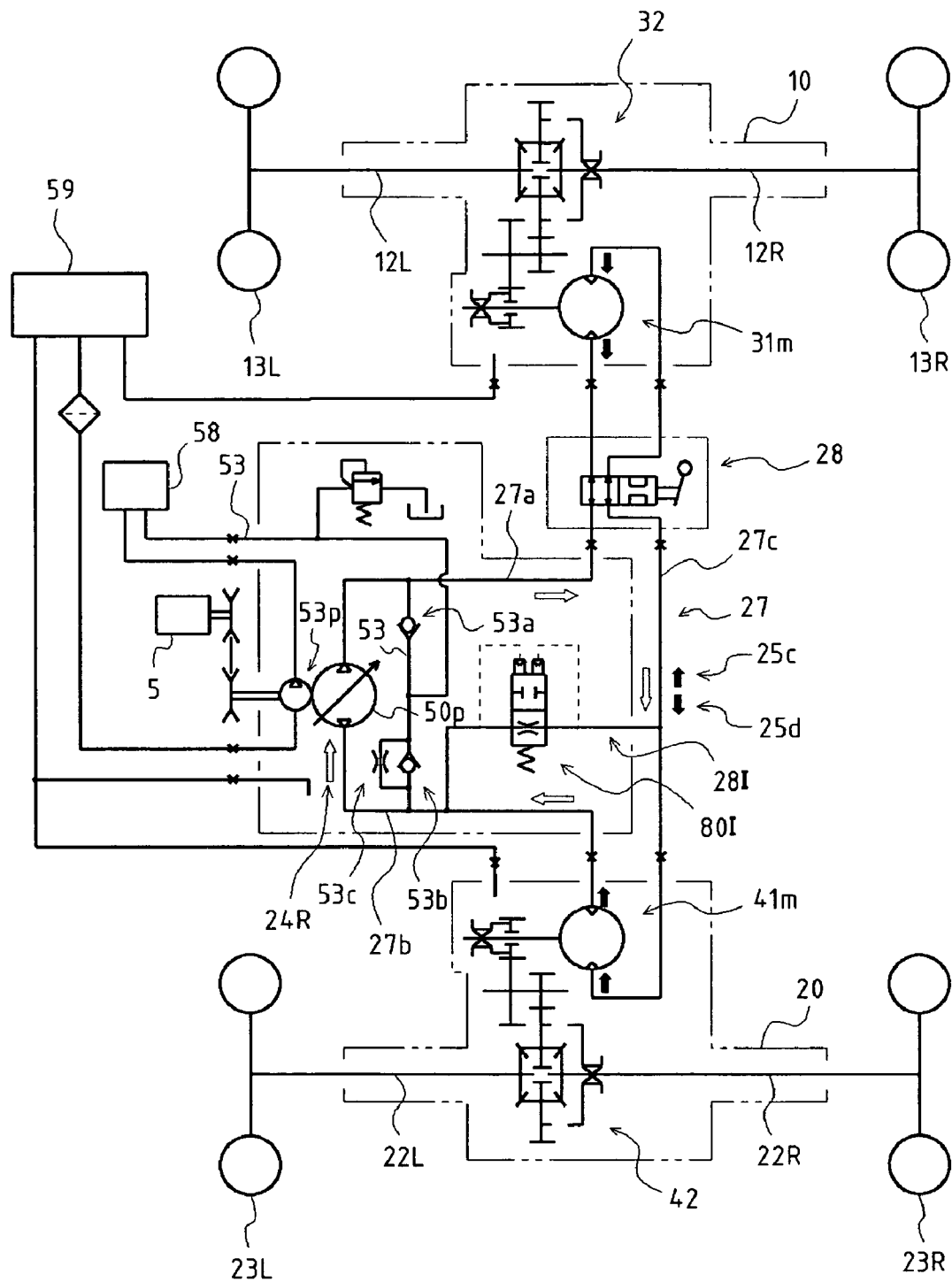
FIG. 19 is a diagram of the hydraulic circuit including the same pressure control means according to the ninth embodiment when the stationary steering operation is performed and the hydraulic motors discharge oil away from each other.

FIGS. 16 and 19 illustrate the hydraulic circuits 27 provided with the same pressure control means corresponding to the stationary steering operation according to a ninth embodiment. The pressure control means includes a pressure control valve 80I, through which a relief passage 28I is interposed between the passage 27*c* and the passage 27*b*.

The pressure control valve 80I is a pilot valve, which is closed when it receives a pilot pressure from either a portion of the relief passage 28I connected to the passage 27*c* or a portion of the relief passage 28I connected to the passage 27*b*. The pilot pressure is generated for closing the pressure control valve 80I when the hydraulic pump 50*p* discharges oil, so as to increase the hydraulic pressure in either the passage 27*b* or 27*c*, i.e., while the vehicle travels. When the hydraulic pump 50*p* (the vehicle) is stationary, oil is not circulated in the hydraulic circuit 27 and the hydraulic pressure in the passages 27*b* and 27*c* is reduced, thereby canceling the pilot pressure for closing the pressure control valve 80I, and whereby the pressure control valve 80I is opened by a biasing force of a spring. Incidentally, an orifice 53*c* bypasses the charge valve 53*b* so as to compensate for the loss of oil in the passage 27*b* for the pilot pressure oil to the pressure control valve 80I.

If the stationary steering is operated and excessive backpressure oil is accumulated in either the passage 27*c* or the passages 27*a* and 27*b*, the hydraulic pressure of the excessively accumulated oil in the passage 27*c* or 27*b* is lower than the pressure of oil in the corresponding passage 27*c* or 27*b* when the hydraulic pump 50*p* acts (when the vehicle travels). Therefore, the pressure control valve 80I is kept open. As a result, the excessive backpressure oil is released from the higher pressure one of the passages 27*c* and 27*b* to the lower pressure one of the passages 27*b* and 27*c* through the opened pressure control valve 80I.

Figure 17:
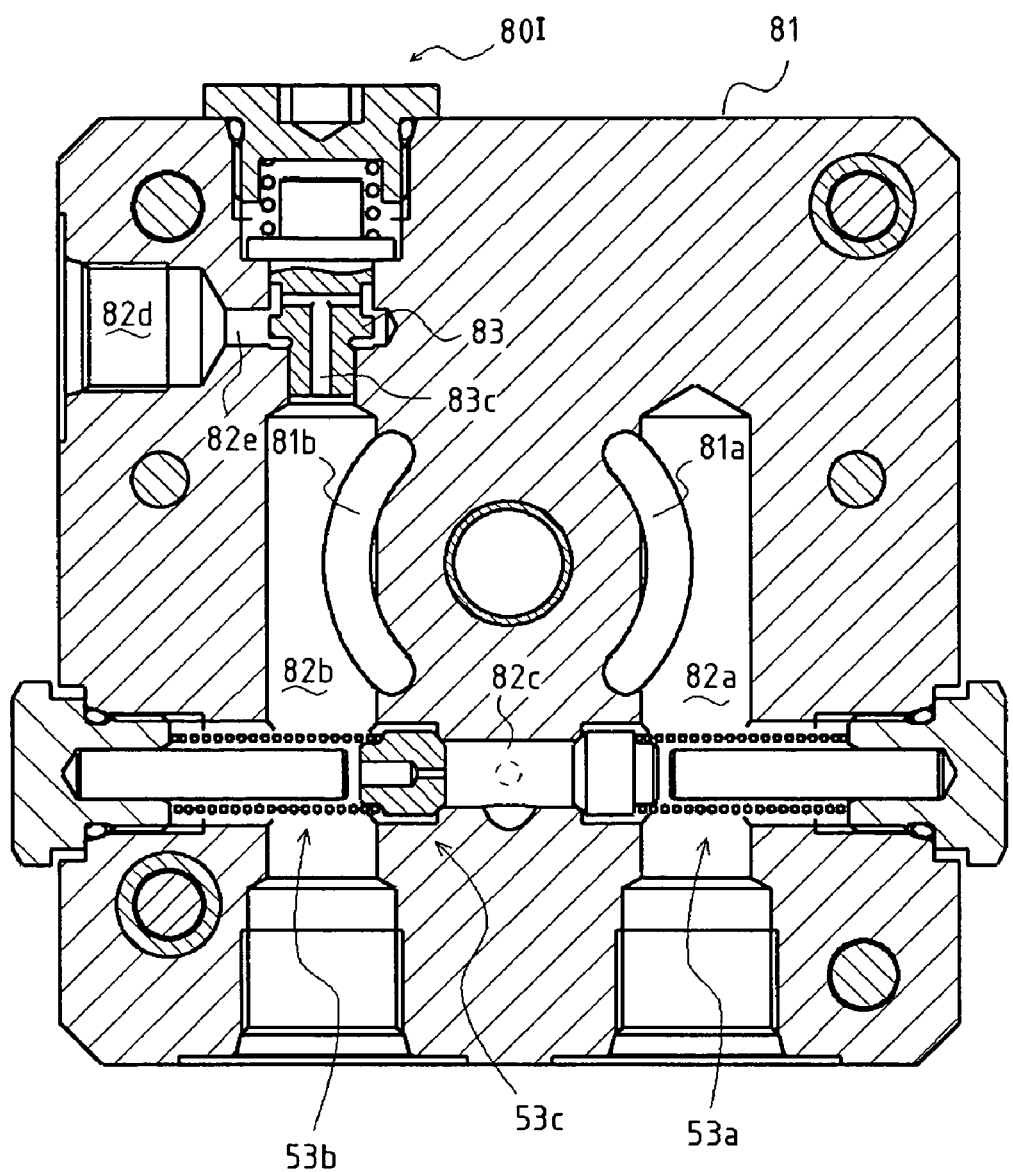
FIG. 17 is a sectional view of a center section of a hydraulic pump including a pressure control valve serving as the pressure control means according to the ninth embodiment.

As shown in FIG. 17, a center section 81 of the hydraulic pump 50*p* is formed therein with a pair of kidney ports 81*a* and 81*b*, and with oil bores 82*a* and 82*b* serving as the passages 27*a* and 27*b* in connection with the respective kidney ports 81*a* and 81*b*. An oil charging bore 82*c* serving as the oil-charging passage 53 is bored in the center section 81. In the center section 81, the charge valve 53*a* is interposed between the oil charging bore 82*c* and the oil bore 82*a*, and the charge valve 53*b* and the orifice 53*c* are interposed between the oil charging bore 82*c* and the oil bore 82*b*.

The center section 81 is formed therein with an oil port 82*d*, which is outwardly open to the passage 27*c*. That is, the oil port 82*d* serves as a portion of the relief passage 28I connected to the passage 27*c*. A communication bore 82*e* is extended inward from the oil port 82*d* in the center section 81. The pressure control valve 80I includes a piston 83, which is inserted into the center section 81 across the communication oil bore 82*e* so as to face the oil bore 82*b*. The pressure control valve 80I switches connection/disconnection of the oil bore 82*b* (serving as the passage 27*b*) to and from the oil port 82*d* (serving as the passage 27*c*) by moving the piston 83.

Figure 18:
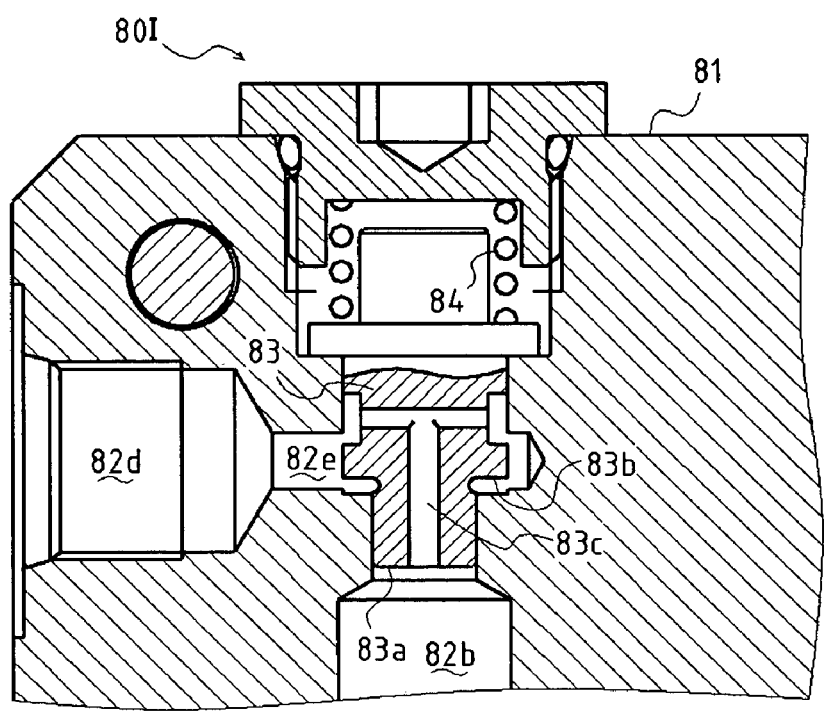
FIG. 18($a$) is an enlarged view of the pressure control valve shown in FIG. 17 when it is opened.
Figure 18:
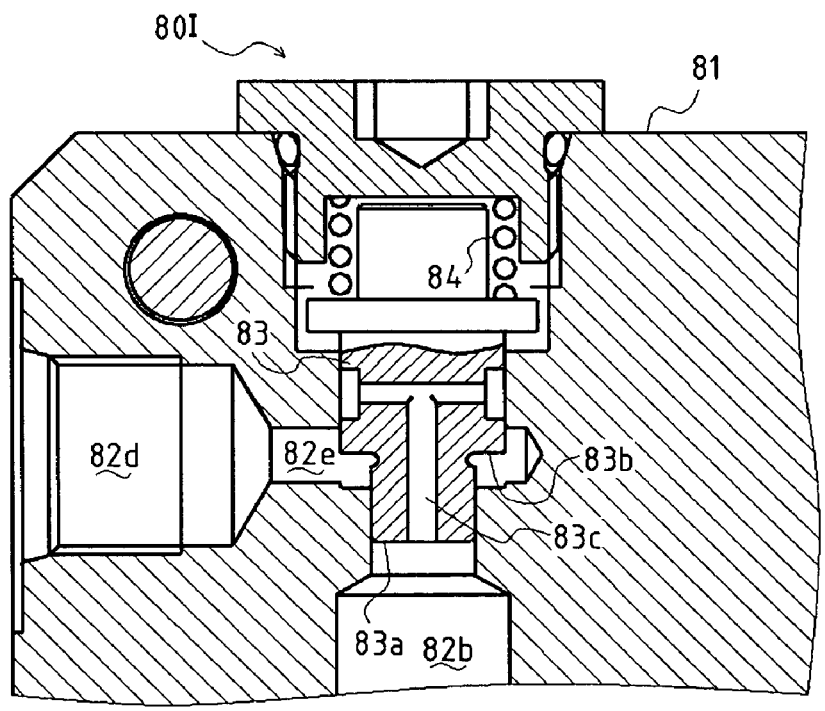

As shown in FIGS. 17, 18(*a*) and 18(*b*), a pressurized surface 83*a* facing to the oil bore 82*b* is provided at one end of the piston 83 so as to serve as a pilot operation portion for receiving a pilot pressure from the oil bore 82*b* (i.e., the passage 27*b*). A pressurized surface 83*b* facing to the communication oil bore 82*e* is provided at a middle portion of the piston 83 so as to serve as a pilot operation portion for receiving a pilot pressure from the communication oil bore 82*e* and the oil port 82*d* (i.e., the passage 27*c*). A spring 84 is provided so as to abut against the other end of the piston 83, whereby the piston 83 is positioned at an opened-valve position shown in FIG. 18(*a*) by biasing force of the spring 84. A connection hole 83*c* for connecting the oil bore 82*b* to the oil port 82*d* is bored in the piston 83.

When the hydraulic pressure in the oil bore 82*b* (passage 27*b*) becomes high, the pressurized surface 83*a* is pressed by the hydraulic pressure so that, as shown in FIG. 18(*b*), the piston 83 is moved to a closed-valve position against the biasing force of the spring 84. Similarly, when the hydraulic pressure in the oil port 82*d* (passage 27*c*) becomes high, the pressurized surface 83*b* is pressed by the hydraulic pressure in the communication oil bore 82*e* so that the piston 83 is moved to the closed-valve position against the biasing force of the spring 84. When the piston 83 is disposed at the closed-valve position, the connection hole 83*c* is positioned so as to disconnect the oil port 82*d* from the oil bore 82*b*. As a result, when the vehicle travels and the hydraulic pressure in the passages 27*b* and 27*c* is increased, the pressure control valve 80I is closed (the relief passage 28I is cut off).

When the hydraulic pump 50*p* does not discharge oil and the hydraulic pressure in the oil bore 82*b* and the oil port 82*d* (the communication oil bore 82*e*) becomes low, the piston 83 is returned to the opened-valve position shown in FIG. 18(*a*) by biasing force of the spring 84 so as to connect the oil port 82*d* to the oil bore 82*b* through the connection hole 83*c*. As a result, when the vehicle is stationary, the pressure control valve 80I is opened (to make the relief passage 28I) so as to permit the release of excessive pressure oil.

The pressure control valve 80I is applicable to both the hydraulic circuits 27 shown in FIGS. 16 and 19. The hydraulic circuit 27 of FIG. 16 is designed so that the direction of oil circulating therein when the vehicle travels forward is designated by the outlined arrows 24L. When the stationary steering operation is performed, the hydraulic motors 31m and 41m act as pumps such as to discharge backpressure oil into the passage 27c toward each other, as designated by the arrows 25a and 25b. In this state, the hydraulic pressure in the passage 27c is higher than that in the passage 27b. The opened pressure control valve 80I allows oil to flow from the passage 27c to the passage 27b.

The hydraulic circuit 27 of FIG. 19 is designed so that the direction of oil circulating therein when the vehicle travels forward is designated by the outlined arrows 24R. When the stationary steering operation is performed, the hydraulic motors 31m and 41m act as pumps such as to discharge backpressure oil into the respective passages 27a and 27b away from each other, as designated by the arrows 25c and 25d. In this state, the hydraulic pressure in the passage 27b is higher than that in the passage 27c. The opened pressure control valve 80I allows oil to flow from the passage 27b to the passage 27c.

Although the invention has been described in its preferred form with a certain degree of particularity, it is understood that the present disclosure of the preferred form can be changed in the details of construction, and the combination and arrangement of parts may be adjusted, without departing from the spirit and the scope of the invention as hereinafter claimed.

What is claimed is:

1. A hydraulic four-wheel driving articulated vehicle comprising:
    a first frame, on which first wheels and a first hydraulic motor driving the first wheels are mounted;
    a second frame, on which second wheels and a second hydraulic motor driving the second wheels are mounted, wherein the first and second frames are connected to each other so as to be relatively rotatable centering on a vertical axis by a steering operation;
    a hydraulic pump;
    a hydraulic circuit fluidly connecting the first and second hydraulic motors in series to the hydraulic pump, the hydraulic circuit including
        a first passage interposed between the hydraulic pump and the first hydraulic motor,
        a second passage interposed between the hydraulic pump and the second hydraulic motor, and
        a third passage interposed between the first and second hydraulic motors, wherein, when the vehicle is stationary and the first and second frames are relatively rotated by the steering operation, the first wheels rotate according to the rotation of the first frame relative to the second frame so as to cause a first flow of oil from the first passage to the third passage through the first hydraulic motor, and the second wheels rotate according to the rotation of the second frame relative to the first frame so as to cause a second flow of oil from the second passage to the third passage through the second hydraulic motor opposite to the first flow of oil, thereby excessively accumulating oil in the third passage because of the opposite first and second flows of oil; and
    pressure control means connected to the third passage so as to automatically release the excessively accumulated oil from the third passage when the vehicle is stationary and the first and second frames are relatively rotated by the steering operation so as to excessively accumulate oil in the third passage.

2. The hydraulic four-wheel driving articulated vehicle as set forth in claim 1, wherein the released excessive pressure oil is returned to a low-pressure part in the hydraulic circuit.

3. The hydraulic four-wheel driving articulated vehicle as set forth in claim 2, wherein the released excessive pressure oil is drained out from the hydraulic circuit and returned to the low-pressure part in the hydraulic circuit through a charge valve.

4. The hydraulic four-wheel driving articulated vehicle as set forth in claim 1, wherein the pressure control means includes a pressure control valve, which is opened for releasing the excessive pressure oil while the vehicle is stationary.

5. The hydraulic four-wheel driving articulated vehicle as set forth in claim 1, wherein the pressure control means automatically releases oil excessively accumulated in the third passage according to change of oil pressure caused by the accumulation of oil in the third passage when the vehicle is stationary and the first and second frames are relatively rotated by the steering operation.

6. The hydraulic four wheel driving articulated vehicle as set forth in claim 1, wherein the pressure control means automatically releases oil excessively accumulated in the third passage according to speed control operation for making the vehicle stationary and the steering operation for relatively rotating the first and second frames.

* * * * *